US012776539B2

(12) United States Patent
Kato et al.

(10) Patent No.: US 12,776,539 B2
(45) Date of Patent: Oct. 27, 2026

(54) ADHESIVE FILM FOR METAL TERMINALS, METHOD FOR PRODUCING ADHESIVE FILM FOR METAL TERMINALS, METAL TERMINAL WITH ADHESIVE FILM FOR METAL TERMINAL, ELECTRICITY STORAGE DEVICE USING SAID ADHESIVE FILM FOR METAL TERMINALS, AND METHOD FOR PRODUCING ELECTRICITY STORAGE DEVICE

(71) Applicant: DAI NIPPON PRINTING CO., LTD., Tokyo (JP)

(72) Inventors: Takahiro Kato, Tokyo (JP); Yoichi Mochizuki, Tokyo (JP); Jun Tanaka, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 792 days.

(21) Appl. No.: 17/909,615

(22) PCT Filed: Mar. 4, 2021

(86) PCT No.: PCT/JP2021/008551
§ 371 (c)(1),
(2) Date: Sep. 6, 2022

(87) PCT Pub. No.: WO2021/177424
PCT Pub. Date: Sep. 10, 2021

(65) Prior Publication Data

US 2023/0116359 A1 Apr. 13, 2023

(30) Foreign Application Priority Data

Mar. 4, 2020 (JP) ................................ 2020-037252

(51) Int. Cl.
*H01M 50/197* (2021.01)
*H01M 50/188* (2021.01)
*H01M 50/193* (2021.01)

(52) U.S. Cl.
CPC ....... *H01M 50/197* (2021.01); *H01M 50/188* (2021.01); *H01M 50/193* (2021.01)

(58) Field of Classification Search
CPC ............. H01M 50/197; H01M 50/193; H01M 50/188
See application file for complete search history.

(56) References Cited

U.S. PATENT DOCUMENTS

2013/0130007 A1 5/2013 Orihara et al.
2016/0099446 A1 4/2016 Muroi
(Continued)

FOREIGN PATENT DOCUMENTS

JP 2007-115678 A 5/2007
JP 2014-225378 A 12/2014
(Continued)

OTHER PUBLICATIONS

May 18, 2021 International Search Report issued in International Patent Application No. PCT/JP2021/008551.
May 18, 2021 Written Opinion issued in International Patent Application No. PCT/JP2021/008551.

*Primary Examiner* — Brian R Ohara
*Assistant Examiner* — Patrick Marshall Greene
(74) *Attorney, Agent, or Firm* — Oliff PLC

(57) ABSTRACT

An adhesive film for metal terminals, which is capable of achieving high sealing performance between itself and a thermally fusible resin layer of an outer covering material in a short time, is interposed between a metal terminal that is electrically connected to an electrode of an electricity storage device element and an outer covering material for electricity storage devices. This adhesive film is configured
(Continued)

from a multilayer body provided with: a first polyolefin layer; a base material; and a second polyolefin layer. The heat of fusion ΔH1 of the first polyolefin layer and the heat of fusion ΔH2 of the second polyolefin layer as determined in accordance with JIS K 7122 (2012) satisfy the relational expression ΔH1>ΔH2; and the heat of fusion ΔH3 of the base material as determined in accordance with JIS K 7122 (2012) is 70 J/g or more.

14 Claims, 5 Drawing Sheets

(56) References Cited

U.S. PATENT DOCUMENTS

| | | | | |
|---|---|---|---|---|
| 2016/0099447 | A1* | 4/2016 | Takada ................ | H01M 50/105<br>429/211 |
| 2017/0005302 | A1* | 1/2017 | Muroi ................. | H01M 50/562 |
| 2021/0106952 | A1* | 4/2021 | Sekiguchi ........... | H01M 10/052 |

FOREIGN PATENT DOCUMENTS

| | | | |
|---|---|---|---|
| JP | 2015-079638 | A | 4/2015 |
| JP | 2015-232945 | A | 12/2015 |
| JP | 2016-184500 | A | 10/2016 |
| JP | 2017-033820 | A | 2/2017 |
| WO | 2012/020721 | A1 | 2/2012 |
| WO | 2014/200087 | A1 | 12/2014 |
| WO | 2015/008826 | A1 | 1/2015 |
| WO | 2015/141772 | A1 | 9/2015 |

* cited by examiner

ADHESIVE FILM FOR METAL TERMINALS, METHOD FOR PRODUCING ADHESIVE FILM FOR METAL TERMINALS, METAL TERMINAL WITH ADHESIVE FILM FOR METAL TERMINAL, ELECTRICITY STORAGE DEVICE USING SAID ADHESIVE FILM FOR METAL TERMINALS, AND METHOD FOR PRODUCING ELECTRICITY STORAGE DEVICE

TECHNICAL FIELD

The present disclosure relates to an adhesive film for metal terminal, a method for manufacturing an adhesive film for metal terminal, a metal terminal with an adhesive film for metal terminal, an electrical storage device using an adhesive film for metal terminal, and a method for manufacturing an electrical storage device.

BACKGROUND ART

Various types of electrical storage devices have been developed heretofore, and in every electrical storage device, an exterior material for electrical storage devices is an essential member for sealing electrical storage device elements such as an electrode and an electrolyte. Metallic exterior materials for electrical storage devices have been often used heretofore as exterior materials for electrical storage devices, and in recent years, electrical storage devices have been required to be diversified in shape, and desired to be thinner and lighter as performance of, for example, electric cars, hybrid electric cars, personal computers, cameras and mobile phones has been enhanced. However, metallic exterior materials for electrical storage devices that have often been heretofore used have the disadvantage that it is difficult to keep up with diversification in shape, and there is a limit on weight reduction.

Thus, in recent years, a laminated sheet with a base material layer, an adhesive layer, a barrier layer and a heat-sealable resin layer laminated in the stated order has been proposed as an exterior material for electrical storage devices which is easily processed into diversified shapes and is capable of achieving thickness reduction and weight reduction. When such a film-shaped exterior material for electrical storage devices is used, an electrical storage device element is sealed with the exterior material for electrical storage devices by heat-welding the peripheral edge portion of the exterior material for electrical storage devices while the heat-sealable resin layers located at the innermost layer of the exterior material for electrical storage devices are opposed to each other.

A metal terminal protrudes from the heat-sealed portion of the exterior material for electrical storage devices, and the electrical storage device element sealed by the exterior material for electrical storage devices is electrically connected to the outside by a metal terminal electrically connected to an electrode of the electrical storage device element. That is, of the portion where the exterior material for electrical storage devices is heat-sealed, a portion where the metal terminal is present is heat-sealed with the metal terminal is sandwiched between heat-sealable resin layers. Since the metal terminal and the heat-sealable resin layer are composed of different materials, adhesion is likely to decrease at an interface between the metal terminal and the heat-sealable resin layer.

Thus, an adhesive film may be disposed between the metal terminal and the heat-sealable resin layer for the purpose of, for example, improving adhesion between the metal terminal and the heat-sealable resin layer. Examples of the adhesive film include those described in Patent Document 1.

PRIOR ART DOCUMENT

Patent Document

Patent Document 1: Japanese Patent Laid-open Publication No. 2015-79638

SUMMARY OF THE INVENTION

Problems to be Solved by the Invention

As described above, an adhesive film disposed between a heat-sealable resin layer of an exterior material for electrical storage devices and a metal terminal is required to exhibit adhesion to the heat-sealable resin layer and the metal terminal when heat-sealed.

In the step of bonding the metal terminal to the exterior material for electrical storage devices with the adhesive film interposed therebetween, typically the metal terminal and the adhesive film are heat-sealed to each other prepare a metal terminal with an adhesive film in advance. Next, with the heat-sealable resin layers opposed to each other in the peripheral edge portion of the exterior material for electrical storage devices, the metal terminal with an adhesive film is interposed between the heat-sealable resin layers opposed to each other, and the peripheral edge portion is heat-sealed, whereby the heat-sealable resin layers are heat-sealed to each other and the heat-sealable resin layer is heat-welded to the adhesive film to seal electrical storage device elements by the exterior material for electrical storage devices.

As described above, the adhesive film is heat-sealed at least twice, where the adhesive film is heat-sealed when bonded to the metal terminal and when bonded to the heat-sealable resin layer of the exterior material for electrical storage devices.

Further, during bonding of the adhesive film to the metal terminal, heating and pressurization are typically performed multiple times, for example, the steps of temporary bonding and primary bonding of the adhesive film to the metal terminal are carried out. The temporary bonding step is a step of temporarily fixing the adhesive film to the metal terminal and removing air bubbles, and the primary bonding step is a step of bonding the adhesive film to the metal terminal by performing heating and pressurizing one or more times under the condition of a higher temperature over the temporary bonding step.

Therefore, the adhesive film is heated and pressurized by heat sealing multiple times before the exterior material for electrical storage devices is sealed. Accordingly, there is a problem that the adhesive film is collapsed by a plurality of times of heat-sealing at a high temperature and high pressure until the exterior material for electrical storage devices, leading to a decrease in thickness. If the thickness of the adhesive film decreases, the sealing property of the exterior material for electrical storage devices is likely to be deteriorated.

In addition, for enhancing the productivity of an electrical storage device, it is required to further shorten the time for heat-sealing (i.e. the time for heating and pressurizing) the exterior material for electrical storage devices. When the time for heat-sealing the peripheral edge portion of the exterior material for electrical storage devices is reduced, for example, from 3 seconds to 1 second, the heat-sealing time decreases to one third, so that productivity is enhanced. However, if heat-sealing is performed in a short time, there is a problem that it is difficult to obtain high adhesion between the heat-sealable resin layer of the exterior material for electrical storage devices and the adhesive film.

Further, if the heat-sealable resin layer of the exterior material for electrical storage devices is heat-sealed in a short time, there is a problem that the followability of the adhesive film to the exterior material for electrical storage devices during heat-sealing becomes insufficient, and thus there remains a gap between the heat-sealable resin layer and the adhesive film, so that the sealing property of the electrical storage device is likely to be deteriorated.

Under these circumstances, a main object of the present disclosure is to provide an adhesive film for metal terminal which can exhibit a high sealing property between the adhesive film and a heat-sealable resin layer of an exterior material for electrical storage devices in a short time, is less likely to be collapsed by heat-sealing, and has excellent followability to the exterior material for electrical storage devices during heat-sealing. Further, an object of the present disclosure is to provide a method for manufacturing the adhesive film for metal terminal, a metal terminal with an adhesive film for metal terminal using the adhesive film for metal terminal, an electrical storage device using the adhesive film for metal terminal, and a method for manufacturing the electrical storage device.

Means for Solving the Problem

The inventors of the present disclosure have extensively conducted studies for solving the above-described problems. Resultantly, the inventors have discovered an adhesive film for metal terminal which can exhibit a high sealing property between the adhesive film and a heat-sealable resin layer of an exterior material for electrical storage devices in a short time, is less likely to be collapsed by heat-sealing, and has excellent followability to the exterior material for electrical storage devices during heat-sealing. The adhesive film for metal terminal includes a laminate a first polyolefin layer disposed on the metal terminal side, a base material, and a second polyolefin layer disposed on the exterior material for electrical storage devices side. The heat of fusion ΔH1 of the first polyolefin layer and the heat of fusion ΔH2 of the second polyolefin layer satisfy the relationship of ΔH1>ΔH2, and the heat of fusion ΔH3 is set to 70 J/g or more. The present disclosure is an invention that has been completed by further conducting studies based on the above-mentioned findings.

That is, the present disclosure provides an invention of an aspect as described below.

An adhesive film for metal terminal which is interposed between a metal terminal electrically connected to an electrode of an electrical storage device element and an exterior material for electrical storage devices that seals the electrical storage device element, in which the adhesive film for metal terminal includes a laminate including, in a stated order, a first polyolefin layer disposed on the metal terminal side, a base material, and a second polyolefin layer disposed on the exterior material for electrical storage devices side;

the heat of fusion ΔH1 of the first polyolefin layer and the heat of fusion ΔH2 of the second polyolefin layer which are measured in accordance with the provisions of JIS K 7122: 2012 satisfy the relationship of ΔH1>ΔH2; and the heat of fusion ΔH3 of the base material which is measured in accordance with the provisions of JIS K 7122: 2012 is 70 J/g or more.

Advantages of the Invention

According to the present disclosure, it is possible to provide an adhesive film for metal terminal which can exhibit a high sealing property between the adhesive film and a heat-sealable resin layer of an exterior material for electrical storage devices in a short time, is less likely to be collapsed by heat-sealing, and has excellent followability to the exterior material for electrical storage devices. Further, an object of the present disclosure is to provide a method for manufacturing the adhesive film for metal terminal, a metal terminal with an adhesive film for metal terminal using the adhesive film for metal terminal, an electrical storage device using the adhesive film for metal terminal, and a method for manufacturing the electrical storage device.

EMBODIMENTS OF THE INVENTION

Figure 1:
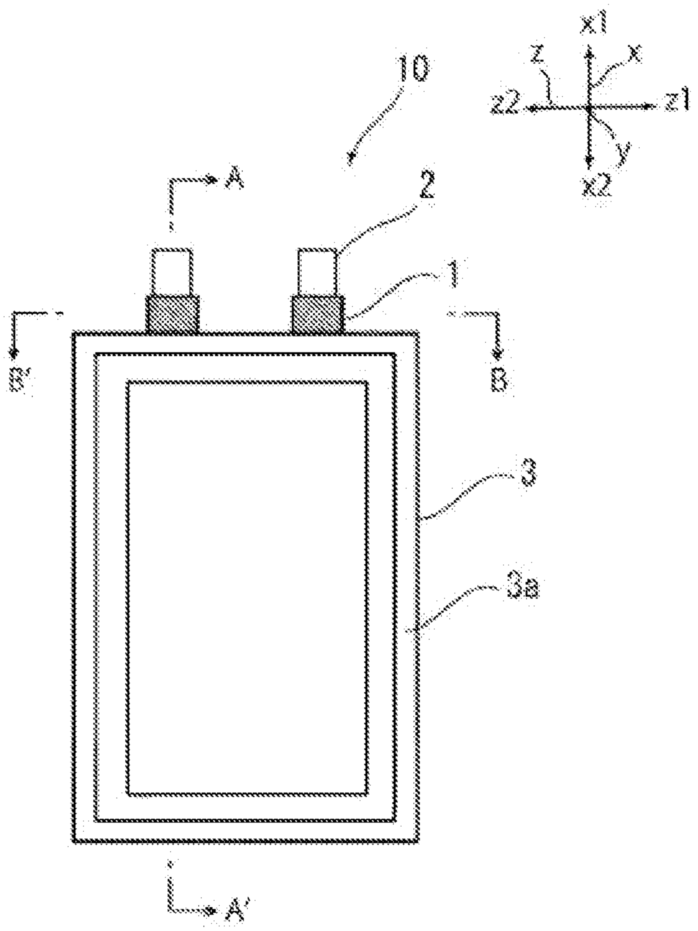
FIG. 1 is a schematic plan view of an electrical storage device of the present disclosure.

The adhesive film for metal terminal according to the present disclosure is an adhesive film for metal terminal which is interposed between a metal terminal electrically connected to an electrode of an electrical storage device element and an exterior material for electrical storage devices that seals the electrical storage device element, in which the adhesive film for metal terminal includes a laminate including, in a stated order, a first polyolefin layer disposed on the metal terminal side, a base material, and a second polyolefin layer disposed on the side of the exterior material for electrical storage devices;

the heat of fusion ΔH1 of the first polyolefin layer and the heat of fusion ΔH2 of the second polyolefin layer which are measured in accordance with the provisions of JIS K 7122: 2012 satisfy the relationship of ΔH1>ΔH2; and the heat of fusion ΔH3 of the base material which is measured in accordance with the provisions of JIS K 7122: 2012 is 70 J/g or more.

Owing to the characteristics mentioned above, the adhesive film for metal terminal according to the present disclosure can exhibit a high sealing property between the adhesive film and a heat-sealable resin layer of an exterior material for electrical storage devices in a short time, is less likely to be collapsed by heat-sealing, and has excellent followability to the exterior material for electrical storage devices.

The electrical storage device of the present disclosure is an electrical storage device including: an electrical storage device element including at least a positive electrode, a negative electrode and an electrolyte; an exterior material for electrical storage devices that seals the electrical storage device element; and a metal terminal electrically connected to each of the positive electrode and the negative electrode and protruding to the outside of the exterior material for electrical storage devices, in which the adhesive film for metal terminal according to the present disclosure is interposed between the metal terminal and the exterior material for electrical storage devices. Hereinafter, the adhesive film for metal terminal, the method for manufacturing the adhesive film for metal terminal, the electrical storage device using the adhesive film for metal terminal, and the method for manufacturing the electrical storage device according to the present disclosure will be described in detail.

For the numerical range in this specification, a numerical range indicated by the term "A to B" means "A or more" and "B or less". For example, the expression of "2 to 15 mm" means 2 mm or more and 15 mm or less.

In addition, examples of the method for identifying the MD (machine direction) of the adhesive film for metal terminal in which a cross-section of the adhesive film for metal terminal (e.g. a cross-section of the first polyolefin layer, the base material or the second polyolefin layer) is observed with an electron microscope to identify a sea-island structure. In the method, the direction parallel to a cross-section in which the average of the diameters of the island shapes in a direction perpendicular to the thickness direction of the adhesive film for metal terminal is maximum can be determined as MD. Specifically, a length-direction cross-section of the adhesive film for metal terminal and cross-sections (a total of 10 cross-sections) at angular intervals of 10 degrees from a direction parallel to the length-direction cross-section to a direction perpendicular to the length-direction cross-section are observed with an electron microscope photograph to examine sea-island structures. Next, in each cross-section, the shape of each island is observed. For the shape of each island, the linear distance between the leftmost end in a direction perpendicular to the thickness direction of the adhesive film for metal terminal and the rightmost end in the perpendicular direction is defined as a diameter y. In each cross-section, the average of the top 20 diameters y in descending order of the diameter y of the island shape is calculated. The direction parallel to a cross-section having the largest average of the diameters y of the island shapes is determined as MD.

1. Adhesive Film for Metal Terminal

The adhesive film for metal terminal according to the present disclosure is interposed between a metal terminal electrically connected to an electrode of an electrical storage device element and an exterior material for electrical storage devices for sealing the electrical storage device element. Specifically, as shown in, for example, FIGS. 1 to 3, an adhesive film 1 for metal terminal according to the present disclosure is interposed between a metal terminal 2 electrically connected to an electrode of an electrical storage device element 4 and an exterior material 3 for electrical storage devices for sealing the electrical storage device element 4. The metal terminal 2 protrudes to the outside of the exterior material 3 for electrical storage devices, and is sandwiched between the exterior materials 3 for electrical storage devices with the adhesive film 1 for metal terminal interposed between the metal terminal 2 and the exterior material 3 at a peripheral edge portion 3*a* of the heat-sealed exterior material 3 for electrical storage devices.

In the present disclosure, the step of temporarily bonding the adhesive film for metal terminal to a metal terminal is performed under the conditions of a temperature of, for example, about 140 to 160 °C, a pressure of about 0.01 to 1.0 MPa, a time of about 3 to 15 seconds, and about 3 to 6 times, and the primary bonding step is performed under the conditions of, for example, a temperature of about 160 to 240 °C, a pressure of about 0.01 to 1.0 MPa, a time of about 3 to 15 seconds, and about 1 to 3 times. In heat-sealing performed with the metal terminal with an adhesive film interposed in the exterior material for electrical storage devices, the heating temperature is typically in the range of about 180 to 210 °C, the pressure is typically about 1.0 to 2.0 MPa, the time is about 3 to 5 seconds, and the number of times of heat-sealing is about 1. Since the adhesive film of the present disclosure can exhibit a high sealing property between the adhesive film and the heat-sealable resin layer of the exterior material in a short time, the heat-sealing time in heat-sealing performed with the metal terminal with an adhesive film interposed in the exterior material for electrical storage devices can be about 0.5 to 3 seconds, about 0.5 to 2 seconds, or even about 0.5 seconds to 1 second.

The adhesive film 1 for metal terminal according to the present disclosure is provided for enhancing adhesion between the metal terminal 2 and the exterior material 3 for electrical storage devices. Enhancement of adhesion between the metal terminal 2 and exterior material 3 for electrical storage devices improves the sealing property of the electrical storage device element 4. As described above, the electrical storage device element is sealed such that the metal terminal 2 electrically connected to the electrode of the electrical storage device element 4 protrudes to the outside of the exterior material 3 for electrical storage devices when the electrical storage device element 4 is heat-sealed. Here, the metal terminal 2 formed of metal and a heat-sealable resin layer 35 (a layer formed of a heat-sealable resin such as a polyolefin) located in the innermost layer of the exterior material 3 for electrical storage devices are formed of different materials, and therefore when such an adhesive film is not used, the sealing property of the electrical storage device element is likely to be low at the interface between the metal terminal 2 and the heat-sealable resin layer 35.

Figure 4:
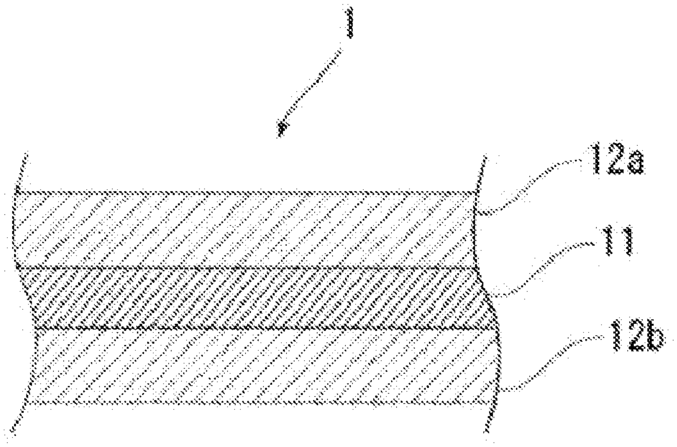
FIG. 4 is a schematic sectional view of an adhesive film for metal terminal according to the present disclosure.
Figure 5:
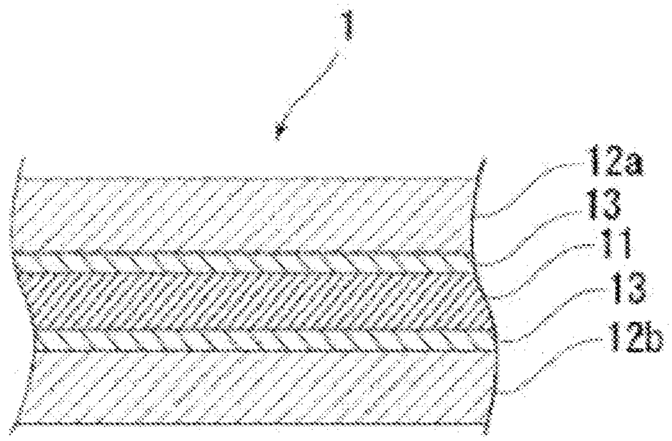
FIG. 5 is a schematic sectional view of an adhesive film for metal terminal according to the present disclosure.

As shown in FIGS. 4 and 5, the adhesive film 1 for metal terminal according to the present disclosure has a configuration in which at least a first polyolefin layer 12*a*, a base material 11 and a second polyolefin layer 12*b* are laminated in the stated order. The first polyolefin layer 12*a* is disposed on the metal terminal 2 side. In addition, the second polyolefin layer 12*b* is disposed on the side of the exterior material 3 for electrical storage devices. The first polyolefin layer 12*a* and the second polyolefin layer 12*b* are located, respectively, on surfaces on both sides in the adhesive film 1 for metal terminal according to the present disclosure.

In the adhesive film 1 for metal terminal according to the present disclosure, the first polyolefin layer 12*a* and the second polyolefin layer 12*b* each contain a polyolefin-based resin. Examples of the polyolefin-based resin include polyolefins and acid-modified polyolefins. It is preferable that the first polyolefin layer 12*a* contains an acid-modified polyolefin, among polyolefin-based resins, and it is more preferable that the first polyolefin layer 12*a* is a layer formed of an acid-modified polyolefin. It is preferable that the second polyolefin layer 12*b* contains a polyolefin or an acid-modified polyolefin, more preferably a polyolefin, among polyolefin-based resins, and it is still more preferable that the second polyolefin layer 12*b* is a layer formed of a polyolefin.

It is preferable that the base material contains a polyolefin-based resin, more preferably a polyolefin, and it is still more preferable that the base material 11 is a layer formed of a polyolefin.

In each of the first polyolefin layer 12*a*, the second polyolefin layer 12*b* and the base material 11, the polyolefin-based resin is preferably a polypropylene-based resin, the polyolefin is preferably polypropylene, and the acid-modified polyolefin is preferably acid-modified polypropylene. The polyolefin-based resin such as a polyolefin and an acid-modified polyolefin may contain known additives, fillers described later, pigments, and the like.

Specific examples of the preferred laminated configuration of the adhesive film 1 for metal terminal according to the present disclosure include a three-layer configuration in which a first polyolefin layer formed of acid-modified polypropylene, a base material formed of polypropylene and a second polyolefin layer formed of polypropylene are laminated in the stated order; and a three-layer configuration in which a first polyolefin layer formed of acid-modified polypropylene, a base material formed of polypropylene and a second polyolefin layer formed of acid-modified polypropylene are laminated in the stated order. Among them, a three-layer configuration is particularly preferable in which a first polyolefin layer formed of acid-modified polypropylene/a base material formed of polypropylene/a second polyolefin layer formed of polypropylene are laminated in the stated order.

Materials forming the first polyolefin layer 12*a*, the second polyolefin layer 12*b* and the base material 11 will be described later in detail.

When the adhesive film 1 for metal terminal according to the present disclosure is disposed between the metal terminal 2 of the electrical storage device 10 and the exterior material 3 for electrical storage devices, the surface of the metal terminal 2 composed of metal and the heat-sealable resin layer 35 (a layer formed of a heat-sealable resin such as a polyolefin) of the exterior material 3 for electrical storage devices are bonded to each other with the adhesive film 1 for metal terminal interposed therebetween. The first polyolefin layer 12*a* of the adhesive film 1 for metal terminal is disposed on the metal terminal 2 side, the second polyolefin layer 12*b* is disposed on the side of the exterior material 3 for electrical storage devices, the first polyolefin layer 12*a* adheres to the metal terminal 2, and the second polyolefin layer 12*b* adheres to the heat-sealable resin layer 35 of the exterior material 3 for electrical storage devices.

In the adhesive film 1 for metal terminal according to the present disclosure, heat of fusion ΔH1 of the first polyolefin layer 12*a* and heat of fusion ΔH2 of the second polyolefin layer 12*b* which are measured in accordance with the provisions of JIS K 7122: 2012 satisfy the relationship of ΔH1>ΔH2. Further, the heat of fusion ΔH3 of the base material 11 which is measured in accordance with the provisions of JIS K 7122: 2012 is 70 J/g or more. In the present disclosure, a method for measuring the heat of fusion is as follows.

<Measurement of Heat of Fusion>

For each measurement sample, the heat of fusion is measured in accordance with the provisions of JIS K 7122: 2012. The measurement is performed with a differential scanning calorimeter (DSC, for example, Differential Scanning Calorimeter Q 200 manufactured by TA Instruments). The measurement sample is held at −50 °C for 15 minutes, then heated from −50 °C to 210 °C at a temperature rise rate of 10 °C/min to measure the first heat of fusion ΔH (J/g), and then held at 210 °C for 10 minutes. Next, the measurement sample is cooled from 210 °C to −50 °C at a temperature lowering rate of 10 °C/min, and held for 15 minutes. Further, the second heat of fusion ΔH (J/g) is measured by heating the measurement sample from −50 °C to 210 °C at a temperature rise rate of 10 °C/min. The flow rate of the nitrogen gas is set to 50 ml/min. In accordance with the above procedure, the value of the first measured heat of fusion ΔH (J/g) is adopted. The heat of fusion is an area of a region surrounded by a base line (a line formed by connecting a start point and an end point of a base-to-base ridge line) and a peak in the DSC curve. The first polyolefin layer and the second polyolefin layer can be taken from the adhesive film for metal terminal, and used as measurement samples. The heat of fusion of the base material can be determined by measuring the heat of fusion of the first polyolefin layer, the second polyolefin layer and the adhesive film for metal terminal, and subtracting the heat of fusion of the first polyolefin layer and the second polyolefin layer from the measured heat of fusion of the adhesive film for metal terminal.

The heat of fusion of the base material, the first polyolefin layer, the second polyolefin layer and the adhesive film for metal terminal can be adjusted by the composition (e.g. the blending ratio of a polyethylene component or the like), molecular backbone, dispersibility, molecular weight, melting point and MFR of each resin, and conditions (e.g. the extrusion width from the T-die, the draw ratio, the draw speed, the heat treatment temperature, and the line speed, cooling rate and extrusion temperature during extrusion) of a T-die and inflation in manufacturing of the adhesive film for metal terminal.

For the adhesive film 1 for metal terminal according to the present disclosure, the difference between the heat of fusion ΔH1 of the first polyolefin layer 12*a* and the heat of fusion ΔH2 of the second polyolefin layer 12*b* is preferably about 3.0 J/g or more, more preferably about 5.0 J/g or more, still more preferably about 10.0 J/g or more for further improving the above-mentioned high sealing property exhibited in a short time, suppression of collapse and followability. From the same viewpoint, the difference is preferably about 18.0 J/g or less, more preferably about 15.0 J/g or less, still more preferably about 12.0 J/g or less. The difference is preferably in the range of about 3.0 to 18.0 J/g, about 3.0 to 15.0 J/g, about 3.0 to 12.0 J/g, about 5.0 to 18.0 J/g, about 5.0 to 15.0 J/g, about 5.0 to 12.0 J/g, about 10.0 to 18.0 J/g, about 10.0 to 15.0 J/g, or about 10.0 to 12.0 J/g. In particular, from the viewpoint of suppressing collapse of the adhesive film 1 for metal terminal, the difference is preferably about 3.0 J/g or more.

From the same viewpoint, the difference between the heat of fusion ΔH3 of the base material 11 and the heat of fusion ΔH1 of the first polyolefin layer 12*a* is preferably about 15.0 J/g or more, more preferably about 18.0 J/g or more, still more preferably about 21.0 J/g or more. From the same viewpoint, the difference is preferably about 35.0 J/g or less, more preferably about 32.0 J/g or less, still more preferably about 29.0 J/g or less. The difference is preferably in the range of about 15.0 to 35.0 J/g, about 15.0 to 32.0 J/g, about 15.0 to 29.0 J/g, about 18.0 to 35.0 J/g, about 18.0 to 32.0 J/g, about 18.0 to 29.0 J/g, about 21.0 to 35.0 J/g, about 21.0 to 32.0 J/g, or about 21.0 to 29.0 J/g. In particular, from the viewpoint of suppressing collapse of the adhesive film 1 for metal terminal, the difference is preferably about 15.0 J/g or more.

From the same viewpoint, the heat of fusion ΔH1 of the first polyolefin layer 12*a*, the heat of fusion ΔH2 of the second polyolefin layer 12*b*, and the heat of fusion ΔH3 of the base material 11 satisfy the relationship of preferably ΔH3>ΔH1>ΔH2, more preferably ΔH3>ΔH1>ΔH2. Since the heat of fusion ΔH3 of the base material 11 is the largest among the heat of fusion ΔH1 of the first polyolefin layer 12*a*, the heat of fusion ΔH2 of the second polyolefin layer 12*b* and the heat of fusion ΔH3 of the base material 11, collapse of the adhesive film 1 can be suitably suppressed. Further, since such a relationship is satisfied, the base material 11 receives excessive heat transferred from the second polyolefin layer 12*b* side to the first polyolefin layer 12*a* in heat-sealing performed with the metal terminal with an adhesive film interposed in the exterior material 3 for electrical storage devices, so that it is possible to suppress deterioration of adhesion to the metal terminal 2 due to excessive heating of the first polyolefin layer 12*a*.

From the same viewpoint, the absolute value of a difference between the heat of fusion ΔH4 of the heat-sealable resin layer 35 of the exterior material 3 for electrical storage devices for which the adhesive film 1 for metal terminal is used and the heat of fusion ΔH2 of the second polyolefin layer 12*b* of the adhesive film 1 for metal terminal is preferably about 0.0 to 5.0 J/g, or about 0.0 to 3.0 J/g. It becomes easier to enhance adhesion between the second polyolefin layer 12*b* and the heat-sealable resin layer 35 as the absolute value of a difference between the heat of fusion ΔH4 and the heat of fusion ΔH2 decreases (i.e. as the absolute value of the difference becomes closer to 0.0 J/g). In particular, from the viewpoint of a sealing property exhibited in a short time and followability for the adhesive film 1 for metal terminal, the difference is preferably about 0.0 J/g or more.

For the adhesive film 1 for metal terminal according to the present disclosure, the difference between the heat of fusion ΔH1 of the first polyolefin layer 12*a* disposed on the metal terminal 2 side is preferably about 30.0 J/g or more, more preferably about 45.0 J/g or more, from the viewpoint of further improving the above-mentioned high sealing property exhibited in a short time, suppression of collapse and followability. From the same viewpoint, the heat of fusion ΔH1 is preferably about 80.0 J/g or less, more preferably about 60.0 J/g or less. The heat of fusion ΔH1 is preferably in the range of about 30.0 to 80.0 J/g, about 30.0 to 60.0 J/g, about 45.0 to 80.0 J/g, or about 45.0 to 60.0 J/g. From the viewpoint of enhancing the film formability of the first polyolefin layer 12*a*, the heat of fusion ΔH1 is preferably about 60.0 J/g or less, more preferably 58.5 J/g or less, and is preferably in the range of about 30.0 to 60.0 J/g, about 30.0 to 58.5 J/g, about 45.0 to 60.0 J/g, or about 45.0 to 58.5 J/g.

From the same viewpoint, the heat of fusion ΔH2 of the second polyolefin layer 12*b* disposed on the side of the exterior material 3 for electrical storage devices is preferably about 20.0 J/g or more, more preferably about 35.0 J/g or more. From the same viewpoint, the heat of fusion ΔH2 is preferably about 70.0 J/g or less, more preferably about 55.0 J/g or less. The heat of fusion ΔH2 is preferably in the range of about 20.0 to 70.0 J/g, about 20.0 to 55.0 J/g, about 35.0 to 70.0 J/g, or about 35.0 to 55.0 J/g. In particular, from the viewpoint of a sealing property exhibited in a short time and followability for the adhesive film 1 for metal terminal, the heat of fusion ΔH2 is preferably about 55.0 J/g or less.

From the same viewpoint, the heat of fusion ΔH3 of the base material 11 is 70.0 J/g or more, preferably about 75.0 J/g or more, more preferably about 80.0 J/g or more. From the same viewpoint, the heat of fusion ΔH3 is preferably about 100.0 J/g or less, more preferably about 90.0 J/g or less. The heat of fusion ΔH1 is preferably in the range of about 70.0 to 100.0 J/g, about 70.0 to 90.0 J/g, about 75.0 to 100.0 J/g, about 75.0 to 90.0 J/g, about 80.0 to 100.0 J/g, or about 80.0 to 90.0 J/g. In particular, from the viewpoint of suppressing collapse of the adhesive film 1 for metal terminal, the heat of fusion ΔH3 is preferably about 70.0 J/g or more.

For the adhesive film 1 for metal terminal according to the present disclosure, it is preferable that the melting peak temperature mp1 of the first polyolefin layer 12*a* and the melting peak temperature mp2 of the second polyolefin layer 12*b* satisfy the relationship of mp1>mp2 from the viewpoint of further improving the above-mentioned high sealing property exhibited in a short time, suppression of collapse, and followability. In the present disclosure, a method for measuring the melting peak temperature is as follows.

<Measurement of Melting Peak Temperature>

For each measurement sample, the melting peak temperature is measured in accordance with the provisions of JIS K 7121: 2012 (Testing Methods for Transition Temperatures of Plastics (Amendment 1 of JIS K 7121: 1987)). The measurement is performed with a differential scanning calorimeter (DSC, for example, Differential Scanning Calorimeter Q 200 manufactured by TA Instruments). The measurement sample is held at −50 °C for 15 minutes, then heated from −50 °C to 210 °C at a temperature rise rate of 10 °C/min to measure the first melting peak temperature P (°C), and then held at 210 °C for 10 minutes. Next, the measurement sample is cooled from 210 °C to −50 °C at a temperature lowering rate of 10 °C/min, and held for 15 minutes. Further, the second melting peak temperature Q (°C) is measured by heating the measurement sample from −50 °C to 210 °C at a temperature rise rate of 10 °C/min. The flow rate of the nitrogen gas is set to 50 ml/min. In accordance with the above procedure, the first measured melting peak temperature P (°C) and the second measured melting peak temperature Q (°C) are determined. In accordance with the above procedure, the value of the first measured melting peak temperature P (°C) is adopted.

From the same viewpoint, the melting peak temperature mp1 of the first polyolefin layer 12*a* disposed on the metal terminal 2 side is preferably about 130 °C or higher, more preferably about 135 °C or higher. From the same point of view, the melting peak temperature mp1 is preferably about 160 °C or lower, more preferably about 150 °C or lower. The melting peak temperature mp1 is preferably in the range of about 130 to 160 °C, about 130 to 150 °C, about 135 to 160 °C, or about 135 to 150 °C From the same viewpoint, the melting peak temperature mp2 of the second polyolefin layer 12*b* disposed on the side of the exterior material 3 for electrical storage devices is preferably about 130 °C or higher, more preferably about 135 °C or higher. From the same point of view, the melting peak temperature mp2 is preferably about 160 °C or lower, more preferably about 150 °C or lower. The melting peak temperature mp2 is preferably in the range of about 130 to 160 °C, about 130 to 150 °C, about 135 to 160 °C, or about 135 to 150 °C From the same viewpoint, the melting peak temperature mp3 of the base material 11 is 140 °C or higher, preferably about 150 °C or higher, more preferably about 160 °C or higher. From the same point of view, the melting peak temperature mp3 is preferably about 180 °C or lower, more preferably about 170 °C or lower. The melting peak temperature mp3 is preferably in the range of about 140 to 180 °C, about 140 to 170 °C, about 150 to 180 °C, about 150 to 170 °C, about 160 to 180 °C, or about 160 to 170 °C From the same viewpoint, the absolute value of a difference between the melting peak temperature mp1 of the first polyolefin layer 12*a* and the melting peak temperature mp2 of the second polyolefin layer 12*b* is preferably about 0 to 10 °C, more preferably about 0 to 5 °C From the same viewpoint, the melting peak temperature mp3 of the base material 11 is preferably higher than the melting peak temperature mp1 of the first polyolefin layer 12*a*, and the difference between the melting peak temperature mp3 of the base material 11 and the melting peak temperature mp1 of the first polyolefin layer 12*a* (melting peak temperature mp3−melting peak temperature mp1) is preferably about 10 °C or higher, more preferably about 15 °C or higher, still more preferably about 20 °C or higher. From the same viewpoint, the difference is preferably about 30 °C or less, more preferably about 27 °C or less, still more preferably about 25 °C or less. The difference is preferably in the range of about 10 to 30 °C, about 10 to 27 °C, about 10 to 25 °C, about 15 to 30 °C, about 15 to 27 °C, about 15 to 25 °C, about 20 to 30 °C, about 20 to 27 °C, or about 20 to 25 °C From the same viewpoint, the melting peak temperature mp1 of the first polyolefin layer 12*a*, the melting peak temperature mp2 of the second polyolefin layer 12*b* and the melting peak temperature mp3 of the base material 11 satisfy the relationship of preferably mp3>mp1>mp2, more preferably mp3>mp1>mp2.

From the same viewpoint, the absolute value of a difference between the melting peak temperature mp4 of the heat-sealable resin layer 35 of the exterior material 3 for electrical storage devices for which the adhesive film 1 for metal terminal is used and the melting peak temperature mp2 of the second polyolefin layer 12*b* of the adhesive film 1 for metal terminal is preferably about 0 to 5 °C, or about 0 to 3 °C. It becomes easier to enhance adhesion between the second polyolefin layer 12*b* and the heat-sealable resin layer 35 as the absolute value of a difference between the melting peak temperature mp4 and the melting peak temperature mp2 decreases (i.e. as the absolute value of the difference becomes closer to 0 °C). In particular, the above-mentioned high sealing property exhibited in a short time and followability for the adhesive film 1 for metal terminal according to the present disclosure can be further improved as the absolute value of a difference between the melting peak temperature mp4 and the melting peak temperature mp2 decreases.

For the adhesive film 1 for metal terminal according to the present disclosure, it is preferable that the melt mass flow rate (MFR) T1 of the first polyolefin layer 12*a* and the melt mass flow rate (MFR) T2 of the second polyolefin layer 12*b* satisfy the relationship of T2>T1 from the viewpoint of further improving the above-mentioned high sealing property exhibited in a short time, suppression of collapse, and followability. In the present disclosure, a method for measuring the melt mass flow rate (MFR) is as follows.

<Measurement of Melt Mass Flow Rate (MFR)>

For each measurement sample, the melt flow rate (g/10 min) is measured with a melt indexer at a measurement temperature of 230 °C under a load of 2.16 kg. For example, for polyolefin, a method conforming to Method A specified in JIS K7210: 2014 can be adopted. The first polyolefin layer, the second polyolefin layer and the base material can be taken from the adhesive film for metal terminal, and used as measurement samples.

From the same viewpoint, the melt mass flow rate (MFR) T1 of the first polyolefin layer 12*a* disposed on the metal terminal 2 side is preferably about 5.0 g/10 min or more, more preferably about 6.0 g/10 min or more. From the same viewpoint, the melt mass flow rate (MFR) T1 is preferably about 10.0 g/10 min or less, more preferably about 8.0 g/10 min or less. The melt mass flow rate (MFR) T1 is preferably in the range of about 5.0 to 10.0 g/10 min, about 5.0 to 8.0 g/10 min, about 6.0 to 10.0 g/10 min, or about 6.0 to 8.0 g/10 min.

From the same viewpoint, the melt mass flow rate (MFR) T2 of the second polyolefin layer 12*b* disposed on the side of the exterior material 3 for electrical storage devices is preferably about 8.0 g/10 min or more, more preferably about 10.0 g/10 min or more. From the same viewpoint, the melt mass flow rate (MFR) T2 is preferably about 15.0 g/10 min or less, more preferably about 13.0 g/10 min or less. The melt mass flow rate (MFR) T2 is preferably in the range of about 8.0 to 15.0 g/10 min, about 8.0 to 13.0 g/10 min, about 10.0 to 15.0 g/10 min, or about 10.0 to 13.0 g/10 min.

From the same viewpoint, the melt mass flow rate (MFR) T3 of the base material 11 is about 1.0 g/10 min or more, preferably about 1.5 g/10 min or more, more preferably about 2.0 g/10 min or more. From the same viewpoint, the melt mass flow rate (MFR) T3 is preferably about 5.0 g/10 min or less, more preferably about 4.0 g/10 min or less. The melt mass flow rate (MFR) T3 is preferably in the range of about 1.0 to 5.0 g/10 min, about 1.0 to 4.0 g/10 min, about 1.5 to 5.0 g/10 min, about 1.5 to 4.0 g/10 min, about 2.0 to 5.0 g/10 min, or about 2.0 to 4.0 g/10 min.

The absolute value of a difference between the melt mass flow rate (MFR) T1 of the first polyolefin layer 12*a* and the melt mass flow rate (MFR) T2 of the second polyolefin layer 12*b* is preferably about 2.0 to 6.0 g/10 min, more preferably about 3.0 to 5.0 g/10 min.

From the same viewpoint, the melt mass flow rate (MFR) T1 of the first polyolefin layer 12*a* is preferably larger than the melt mass flow rate (MFR) T3 of the base material 11, and the difference between the melt mass flow rate (MFR) T3 of the base material 11 and the melt mass flow rate (MFR) T1 of the first polyolefin layer 12*a* (melt mass flow rate (MFR) T3—melt mass flow rate (MFR) T1) is preferably about 2.0 g/10 min or more, more preferably about 2.5 g/10 min or more, still more preferably about 3.0 g/10 min or more. From the same viewpoint, the difference is preferably about 6.0 g/10 min or less, more preferably about 5.5 g/10 min or less, still more preferably about 5.0 g/10 min or less. The difference is preferably in the range of about 2.0 to 6.0 g/10 min, about 2.0 to 5.5 g/10 min, about 2.0 to 5.0 g/10 min, about 2.5 to 6.0 g/10 min, about 2.5 to 5.5 g/10 min, about 2.5 to 5.0 g/10 min, about 3.0 to 6.0 g/10 min, about 3.0 to 5.5 g/10 min, or about 3.0 to 5.0 g/10 min.

From the same viewpoint, it is preferable that the melt mass flow rate (MFR) T1 of the first polyolefin layer 12*a*, the melt mass flow rate (MFR) T2 of the second polyolefin layer

12*b* and the melt mass flow rate (MFR) T3 of the base material 11 satisfy the relationship of T2>T1>T3.

From the same viewpoint, the absolute value of a difference between the melt mass flow rate (MFR) T4 of the heat-sealable resin layer 35 of the exterior material for electrical storage devices for which the adhesive film 1 for metal terminal is used and the melt mass flow rate (MFR) T2 of the second polyolefin layer 12*b* of the adhesive film 1 for metal terminal is preferably about 0.0 to 5.0 g/10 min or about 0.0 to 3.0 g/10 min. It becomes easier to enhance adhesion between the second polyolefin layer 12*b* and the heat-sealable resin layer 35 as the absolute value of a difference between the melt mass flow rate (MFR) T4 and the melt mass flow rate (MFR) T2 decreases (i.e. as the absolute value of the difference becomes closer to 0.0 g/10 min). In particular, the above-mentioned high sealing property exhibited in a short time and followability for the adhesive film 1 for metal terminal according to the present disclosure can be further improved as the absolute value of a difference between the melt mass flow rate (MFR) T4 and the melt mass flow rate (MFR) T2 decreases.

For the adhesive film 1 for metal terminal according to the present disclosure, the total thickness of the adhesive film 1 for metal terminal is, for example, about 60 μm or more, preferably about 80 μm or more, more preferably about 100 μm or more, still more preferably about 120 μm or more, even more preferably about 150 μm or more, from the viewpoint of further improving the above-mentioned high sealing property exhibited in a short time, suppression of collapse, and followability. In addition, the total thickness of the adhesive film 1 for metal terminal according to the present disclosure is preferably about 300 μm or less, more preferably 220 μm or less. The total thickness of the adhesive film 1 for metal terminal according to the present disclosure is preferably in the range of about 60 to 300 μm, about 60 to 220 μm, about 80 to 300 μm, about 80 to 220 μm, about 100 to 300 μm, about 100 to 220 μm, about 120 to 300 μm, about 120 to 220 μm, about 150 to 300 μm, or about 150 to 220 μm. As a more specific example, for example, the total thickness is preferably about 60 to 100 μm when the adhesive film 1 for metal terminal according to the present disclosure is used for consumer electrical storage devices, and the total thickness is preferably about 100 to 220 μm when the adhesive film 1 for metal terminal is used for vehicle-mounted electrical storage devices.

Hereinafter, the materials for forming the first polyolefin layer 12*a*, the second polyolefin layer 12*b* and the base material 11, and the thicknesses thereof will be described in detail.

[First Polyolefin Layer 12*a* and Second Polyolefin Layer 12*b*]

As shown in FIGS. 4 and 5, the adhesive film 1 for metal terminal according to the present disclosure includes the first polyolefin layer 12*a* on one side of the base material 11 and the second polyolefin layer 12*b* on the other side of the base material 11. The first polyolefin layer 12*a* is disposed on the metal terminal 2 side. In addition, the second polyolefin layer 12*b* is disposed on the side of the exterior material 3 for electrical storage devices. The first polyolefin layer 12*a* and the second polyolefin layer 12*b* are located, respectively, on surfaces on both sides in the adhesive film 1 for metal terminal according to the present disclosure.

In the adhesive film 1 for metal terminal according to the present disclosure, the first polyolefin layer 12*a* and the second polyolefin layer 12*b* each contain a polyolefin-based resin. Examples of the polyolefin-based resin include polyolefins and acid-modified polyolefins. It is preferable that the first polyolefin layer 12*a* contains an acid-modified polyolefin, among polyolefin-based resins, and it is more preferable that the first polyolefin layer 12*a* is a layer formed of an acid-modified polyolefin. It is preferable that the second polyolefin layer 12*b* contains a polyolefin or an acid-modified polyolefin, more preferably a polyolefin, among polyolefin-based resins, and it is still more preferable that the second polyolefin layer 12*b* is a layer formed of a polyolefin. The acid-modified polyolefin has high affinity for a metal. In addition, the polyolefin has high affinity for a heat-weldable resin such as a polyolefin. Therefore, in the adhesive film 1 for metal terminal according to the present disclosure, further excellent adhesion can be exhibited at an interface between the adhesive film 1 for metal terminal and the metal terminal 2 by disposing the first polyolefin layer 12*a* formed of an acid-modified polyolefin on the metal terminal 2 side. In addition, further excellent adhesion can be exhibited at an interface between the adhesive film 1 for metal terminal and the heat-sealable resin layer 35 by disposing the second polyolefin layer 12*b* formed of a polyolefin on the heat-sealable resin layer 35 side of the exterior material 3 for electrical storage devices.

Specific examples of the preferred laminated configuration of the adhesive film 1 for metal terminal according to the present disclosure include a three-layer configuration in which a first polyolefin layer formed of acid-modified polypropylene, a base material formed of polypropylene and a second polyolefin layer formed of polypropylene are laminated in the stated order; and a three-layer configuration in which a first polyolefin layer formed of acid-modified polypropylene, a base material formed of polypropylene and a second polyolefin layer formed of acid-modified polypropylene are laminated in the stated order. Among them, a three-layer configuration is particularly preferable in which a first polyolefin layer formed of acid-modified polypropylene/a base material formed of polypropylene/a second polyolefin layer formed of polypropylene are laminated in the stated order.

The acid-modified polyolefin is not particularly limited as long as it is a polyolefin modified with an acid, and a polyolefin graft-modified with an unsaturated carboxylic acid or an anhydride thereof is preferable.

Specific examples of the polyolefin to be acid-modified include polyethylenes such as low-density polyethylene, medium-density polyethylene, high-density polyethylene and linear low-density polyethylene; crystalline or noncrystalline polypropylene such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyethylenes and polypropylene are preferable, with polypropylene being particularly preferable.

The polyolefin modified with an acid may be a cyclic polyolefin. For example, the carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin.

The cyclic polyolefin modified with an acid is a copolymer of an olefin and a cyclic monomer, and examples of the olefin as a constituent monomer of the cyclic polyolefin include ethylene, propylene, 4-methyl-1-pentene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferable, and norbornene is further preferable. Examples of the constituent monomer include styrene.

Examples of the carboxylic acid or anhydride thereof which is used for acid modification include maleic acid, acrylic acid, itaconic acid, crotonic acid, maleic anhydride and itaconic anhydride. It is preferable that a peak derived from maleic anhydride is detected when the first polyolefin layer 12*a* is analyzed by infrared spectroscopy. For example, when a maleic anhydride-modified polyolefin is measured by infrared spectroscopy, peaks derived from maleic anhydride are detected near wavenumbers of 1760 $cm^{-1}$ and 1780 $cm^{-1}$. When the first polyolefin layer 12*a* or the second polyolefin layer 12*b* is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

The first polyolefin layer 12*a* and the second polyolefin layer 12*b* may be each formed from one resin component alone, or may be formed from a blend polymer obtained by combining two or more resin components. Further, the first polyolefin layer 12*a* and the second polyolefin layer 12*b* may be each formed of only one layer, but may be formed of two or more layers with the same resin component or different resin components. From formability of the first polyolefin layer 12*a* and the second polyolefin layer 12*b*, it is preferable that these layers are each formed from a blend polymer obtained by combining two or more resin components. When formed from the blend polymer, it is preferable that the first polyolefin layer 12*a* contains acid-modified polypropylene as a main component (component contained at 50 mass % or more), and other resins at 50 mass % or less (polyethylene is preferable from the viewpoint of improving flexibility). In addition, it is preferable that the second polyolefin layer 12*b* contains polypropylene as a main component (component contained at 50 mass % or more), and other resins at 50 mass % or less (polyethylene is preferable from the viewpoint of improving flexibility). On the other hand, from the viewpoint of the electrolytic solution resistance of the first polyolefin layer 12*a* and the second polyolefin layer 12*b*, it is preferable that the first polyolefin layer 12*a* contains acid-modified polypropylene alone as a resin, and it is preferable that the second polyolefin layer 12*b* contains polypropylene alone as a resin.

Further, the first polyolefin layer 12*a* and the second polyolefin layer 12*b* may each contain a filler if necessary. When the first polyolefin layer 12*a* and the second polyolefin layer 12*b* contain a filler, a short circuit between the metal terminal 2 and a barrier layer 33 of the exterior material 3 for electrical storage devices can be effectively suppressed because the filler functions as a spacer. The particle size of the filler is in the range of about 0.1 to 35 μm, preferably about 5.0 to 30 μm, more preferably about 10 to 25 μm. In addition, the contents of the fillers based on 100 parts by mass of resin components forming the first polyolefin layer 12*a* and the second polyolefin layer 12*b*, respectively, are each about 5 to 30 parts by mass, more preferably about 10 to 20 parts by mass.

As the filler, either an inorganic filler or an organic filler can be used. Examples of the inorganic filler include carbon (carbon, graphite), silica, aluminum oxide, barium titanate, iron oxide, silicon carbide, zirconium oxide, zirconium silicate, magnesium oxide, titanium oxide, calcium aluminate, calcium hydroxide, aluminum hydroxide, magnesium hydroxide and calcium carbonate. In addition, examples of the organic filler include fluororesins, phenol resins, urea resins, epoxy resins, acrylic resins, benzoguanamine-formaldehyde condensates, melamine-formaldehyde condensates, crosslinked products of polymethyl methacrylate, and crosslinked products of polyethylene. From the viewpoint of shape stability, rigidity and content resistance, aluminum oxide, silica, fluororesins, acrylic resins and benzoguanamine-formaldehyde condensates are preferable, and among them, spherical aluminum oxide and silica are more preferable. As a method for mixing the filler with resin components that form the first polyolefin layer 12*a* and the second polyolefin layer 12*b*, a method in which a masterbatch formed by melting and blending the resin components and the filler with a Banbury mixer or the like is adjusted to a predetermined mixing ratio; a method in which the filler is directly mixed with the resin components; or the like can be adopted.

In addition, the first polyolefin layer 12*a* and the second polyolefin layer 12*b* may each contain a pigment if necessary. As the pigment, various inorganic pigments can be used. As a specific example of the pigment, carbon (carbon, graphite) exemplified as the filler can be preferably exemplified. Carbon (carbon, graphite) is a material generally used inside an electrical storage device, and there is no possibility of being dissolved in an electrolytic solution. In addition, the carbon has a high coloring effect, allows a sufficient coloring effect to be obtained with an addition amount small enough not to hinder bondability, is not melted by heat, and is capable of increasing the apparent melt viscosity of the resin added. Further, it is possible to impart an excellent sealing property between the exterior material for electrical storage devices and the metal terminal by preventing a pressed portion from being thinned during thermal bonding (heat-sealing).

When a pigment is added to each of the first polyolefin layer 12*a* and the second polyolefin layer 12*b*, for example, the addition amounts of the pigments based on 100 parts by mass of resin components forming the first polyolefin layer 12*a* and the second polyolefin layer 12*b*, respectively, are each about 0.05 to 0.3 parts by mass, preferably about 0.1 to 0.2 parts by mass, when carbon black having a particle size of about 0.03 μm is used. By adding a pigment to the first polyolefin layer 12*a* and the second polyolefin layer 12*b*, the presence or absence of the adhesive film 1 for metal terminal can be detected by a sensor, or can be visually inspected. It is particularly preferable that the first polyolefin layer 12*a* contains a pigment. When a filler and a pigment are added to the first polyolefin layer 12*a* and the second polyolefin layer 12*b*, the filler and the pigment may be added to the first polyolefin layer 12*a* and the second polyolefin layer 12*b* identically, and from the viewpoint of ensuring that the heat-weldability of the adhesive film 1 for metal terminal, it is preferable that the filler and the pigment are added separately between the first polyolefin layer 12*a* and the second polyolefin layer 12*b*.

For the adhesive film 1 for metal terminal according to the present disclosure, the thickness of each of the first polyolefin layer 12*a* and the second polyolefin layer 12*b* is preferably about 10 μm or more, more preferably about 15 μm or more, still more preferably about 20 μm or more, even more preferably 30 μm or more, and preferably about 60 μm or less, more preferably about 55 μm or less, still more preferably 50 m or less, even more preferably 40 μm or less, from the viewpoint of further improving the above-mentioned high sealing property exhibited in a short time, suppression of collapse, and followability. The thickness of each of the first polyolefin layer 12*a* and the second polyolefin layer 12*b* is preferably in the range of about 10 to 60 μm, about 10 to 55 μm, about 10 to 50 μm, about 10 to 40 μm, about 15 to 60 μm, about 15 to 55 μm, about 15 to 50 μm, about 15 to 40 μm, about 20 to 60 μm, about 20 to 55 μm, about 20 to 50 μm, about 20 to 40 μm, about 30 to 60 μm, about 30 to 55 μm, about 30 to 50 μm, or about 30 to 40 μm.

From the same viewpoint, the ratio of the thickness of the base material 11 to the total thickness of the first polyolefin layer 12*a* and the second polyolefin layer 12*b* is preferably about 0.3 or more, more preferably about 0.4 or more, still more preferably 0.5 or more, and preferably about 1.0 or less, more preferably about 0.8 or less, and is preferably in the range of about 0.3 to 1.0, about 0.3 to 0.8, about 0.4 to 1.0, about 0.4 to 0.8, about 0.5 to 1.0, about 0.5 to 0.8.

When the total thickness of the adhesive film 1 for metal terminal is 100%, the ratio of the total thickness of the first polyolefin layer 12*a* and the second polyolefin layer 12*b* is preferably about 30 to 80%, more preferably about 50 to 70%.

[Base Material Layer 11]

In the adhesive film 1 for metal terminal, the base material 11 is a layer that functions as a support for the adhesive film 1 for metal terminal. The base material 11 is provided as necessary.

The material that forms the base material 11 is not particularly limited as long as it has an insulation quality. Examples of the material that forms the base material 11 include polyolefin-based resins, polyamide-based resins, polyester-based resins, epoxy resins, acrylic resins, fluororesins, silicone resins, phenol resins, silicon resins, polyurethane resins, polyether imide, polycarbonate, and mixtures and copolymers thereof. Among them, polyolefin-based resins are particularly preferable. That is, the material that forms the base material 11 is preferably a resin containing a polyolefin backbone such as a polyolefin or an acid-modified polyolefin. The resin forming the base material 11 can be confirmed to contain a polyolefin backbone by an analysis method such as infrared spectroscopy or gas chromatography mass spectrometry.

As described above, it is preferable that the base material 11 contains a polyolefin-based resin, more preferably a polyolefin, and it is still more preferable that the base material 11 is a layer formed of a polyolefin. The layer formed of polyolefin may be a stretched polyolefin film or an unstretched polyolefin film, and is preferably an unstretched polyolefin film. Specific examples of the polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylene are preferred, with polypropylene being more preferred. In addition, it is preferable that the base material 11 contains homopolypropylene, it is more preferable that the base material 11 is formed of homopolypropylene and it is still more preferable that the base material is an unstretched homopolypropylene film because excellent electrolytic solution resistance is obtained.

Specific examples of the polyamide include aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

Specific examples of the polyester include polyethylene terephthalate, polybutylene terephthalate, polyethylene naphthalate, polybutylene naphthalate, polyethylene isophthalate, copolymerization polyesters with ethylene terephthalate as a main repeating unit, and copolymerization polyesters with a butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof.

In addition, the base material 11 may be formed of a nonwoven fabric formed of any of the resins described above. When the base material 11 is a nonwoven fabric, it is preferable that the base material 11 is composed of the above-described polyolefin-based resin, polyamide resin or the like.

The base material 11 may be a single layer, or may have multiple layers. When the base material 11 has multiple layers, at least one layer may include a layer having a heat of fusion ΔH3 of 70 J/g or more. Specific examples of the layer having multiple layers include those having a three-layer configuration in which block polypropylene, homopolypropylene and block polypropylene are laminated in the stated order.

In addition, a colorant can be blended into the base material 11 so that the base material 11 is a layer containing a colorant. In addition, the light transmittance can be adjusted by selecting a resin having low transparency. When the base material 11 is a film, it is also possible to use a colored film or a film having low transparency. In addition, when the base material 11 is a nonwoven fabric, it is possible to use a nonwoven fabric using fibers or a binder containing a colorant, or a nonwoven fabric having low transparency.

When the base material 11 is composed of a resin film, a surface of the base material 11 may be subjected to known easy-adhesive means such as corona discharge treatment, ozone treatment or plasma treatment if necessary.

For the adhesive film 1 for metal terminal according to the present disclosure, the total thickness of the base material 11 is preferably 120 μm or less, more preferably 100 μm or less, still more preferably 80 μm or less, even more preferably 70 μm or less, from the viewpoint of further improving the above-mentioned high sealing property exhibited in a short time, suppression of collapse, and followability. In addition, the thickness of the base material 11 is preferably about 20 μm or more, more preferably about 30 μm or more, still more preferably about 40 μm or more. The thickness of the base material 11 is preferably in the range of 20 to 120 μm, about 20 to 100 μm, about 20 to 80 μm, about 20 to 70 μm, about 30 to 120 μm, about 30 to 100 μm, about 30 to 80 μm, about 30 to 70 μm, about 40 to 120 μm, about 40 to 100 μm, about 40 to 80 μm, or about 40 to 70 μm.

[Adhesion Promotor Layer 13]

The adhesion promotor layer 13 is a layer provided if necessary for the purpose of firmly bonding the base material 11 to the first polyolefin layer 12*a* and the second polyolefin layer 12*b* (see FIG. 5). The adhesion promotor layer 13 may be provided only on one side or both sides between the base material 11 and the first polyolefin layer 12*a* and second polyolefin layer 12*b*.

The adhesion promotor layer 13 can be formed using a known adhesion promotor such as an isocyanate-based adhesion promotor, a polyethyleneimine-based adhesion promotor, a polyester-based adhesion promotor, a polyurethane-based adhesion promotor or a polybutadiene-based adhesion promotor. From the viewpoint of further improving electrolytic solution resistance, it is preferable that the adhesion promotor layer is formed of an isocyanate-based adhesion promotor, among the above-mentioned adhesion promotors. As the isocyanate-based adhesion promotor, one composed of an isocyanate component selected from a triisocyanate monomer and polymeric MDI is excellent in lamination strength and undergoes little decrease in lamination strength after immersion in an electrolytic solution. In particular, it is particularly preferable to form the adhesion promotor layer from an adhesion promotor composed of triphenylmethane-4,4',4"-triisocyanate which is a triisocyanate monomer or polymethylene polyphenyl polyisocyanate which is polymeric MDI (NCO content: about 30% and viscosity: 200 to 700 mPa·s). In addition, it is also preferable to form the adhesion promotor layer from tris(p-isocyanatephenyl)thiophosphate which is a triisocyanate monomer, or a two-liquid curable adhesion promotor contain a polyethyleneimine-based resin as a main agent and polycarbodiimide as a crosslinking agent.

The adhesion promotor layer 13 can be formed by performing coating by a known coating method such as a bar coating method, a roll coating method or a gravure coating method, and drying. The coating amount of the adhesion promotor is about 20 to 100 $mg/m^2$, preferably about 40 to 60 $mg/m^2$ in the case of an adhesion promotor composed of triisocyanate, about 40 to 150 $mg/m^2$, preferably about 60 to 100 $mg/m^2$ in the case of an adhesion promotor composed of polymeric MDI, and about 5 to 50 $mg/m^2$, preferably about 10 to 30 $mg/m^2$ in the case of a two-liquid curable adhesion promotor containing polyethyleneimine as a main agent and polycarbodiimide as a crosslinking agent. The triisocyanate monomer is a monomer having three isocyanate groups per molecule, and the polymeric MDI is a mixture of MDI and a MDI oligomer obtained by polymerizing MDI, and is represented by the following formula.

[Chemical Formula I]

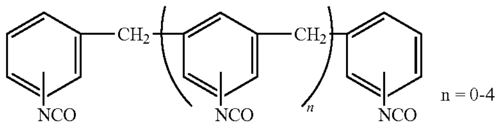

The adhesive film 1 for metal terminal according to the present disclosure can be manufactured by, for example, laminating the first polyolefin layer 12*a* and the second polyolefin layer 12*b* on both surfaces, respectively, of the base material 11. The base material 11 can be laminated to the first polyolefin layer 12*a* and the second polyolefin layer 12*b* by a known method such as an extrusion lamination method, a T-die method, an inflation method or a thermal lamination method. When the base material 11 is laminated to the first polyolefin layer 12*a* and the second polyolefin layer 12*b* with the adhesion promotor layer 13 interposed therebetween, for example, the adhesion promotor for forming the adhesion promotor layer 13 may be applied and dried on the base material 11 by the above-described method, followed by laminating the first polyolefin layer 12*a* and the second polyolefin layer 12*b* onto the adhesion promotor layer 13.

Figure 2:
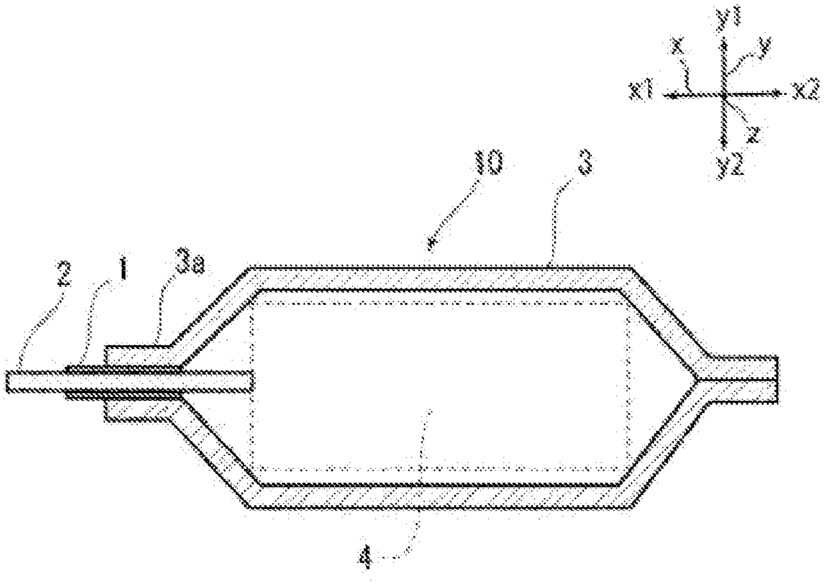
FIG. 2 is a schematic sectional view taken along line A-A' in FIG. 1.
Figure 3:
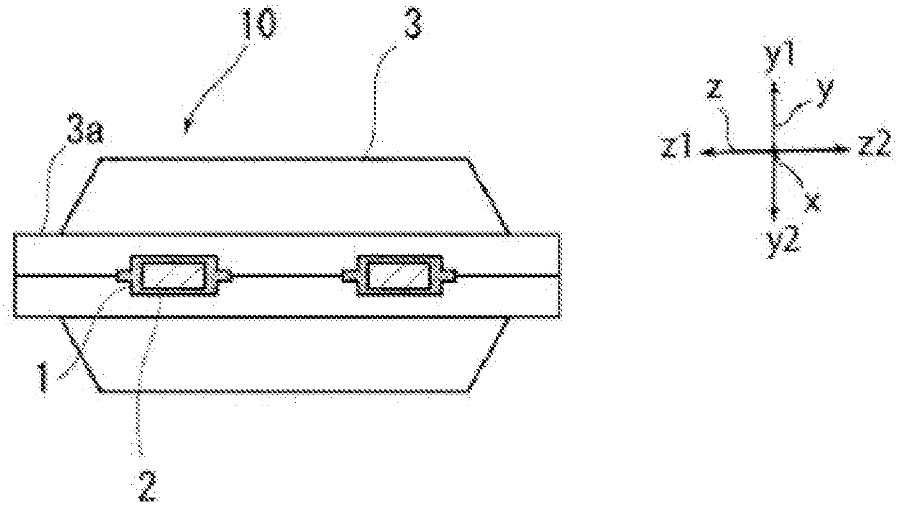
FIG. 3 is a schematic sectional view taken along line B-B' in FIG. 1.

The method for interposing the adhesive film 1 for metal terminal between the metal terminal 2 and the exterior material 3 for electrical storage devices is not particularly limited, and for example, as shown in FIGS. 1 to 3, the adhesive film 1 for metal terminal may be wound around the metal terminal 2 at a portion where the metal terminal 2 is sandwiched between the exterior materials 3 for electrical storage devices. In addition, the adhesive film 1 for metal terminal may be disposed on both sides of the metal terminal 2 so as to cross the two metal terminals 2 in a portion where the metal terminal 2 is sandwiched between the exterior materials 3 for electrical storage devices.

[Metal Terminal 2]

The adhesive film 1 for metal terminal according to the present disclosure is interposed between the metal terminal 2 and the exterior material 3 for electrical storage devices. The metal terminal 2 (tab) is a conductive member electrically connected to an electrode (positive electrode or negative electrode) of the electrical storage device element 4, and is composed of a metal material. The metal material that forms the metal terminal 2 is not particularly limited, and examples thereof include aluminum, nickel, and copper. For example, the metal terminal 2 connected to a positive electrode of a lithium ion electrical storage device is typically composed of aluminum or the like. In addition, the metal terminal 2 connected to a negative electrode of a lithium ion electrical storage device is typically composed of copper, nickel or the like.

From the viewpoint of enhancing electrolytic solution resistance, it is preferable that the surface of the metal terminal 2 is subjected to chemical conversion treatment. For example, when the metal terminal 2 is formed of aluminum, specific examples of the chemical conversion treatment include a known method in which a corrosion-resistant film of a phosphate, a chromate, a fluoride, a triazinethiol compound or the like. Among the methods for forming a corrosion-resistant film, phosphoric acid chromate treatment using a material including three components: a phenol resin, a chromium (III) fluoride compound and phosphoric acid is preferred.

The size of the metal terminal 2 may be appropriately set according to the size of an electrical storage device used. The thickness of the metal terminal 2 is preferably about 50 to 1000 μm, more preferably about 70 to 800 km. In addition, the length of the metal terminal 2 is preferably about 1 to 200 mm, more preferably about 3 to 150 mm. In addition, the length of the metal terminal 2 is preferably about 1 to 200 mm, more preferably about 3 to 150 mm.

[Exterior Material 3 for Electrical Storage Devices]

Figure 6:
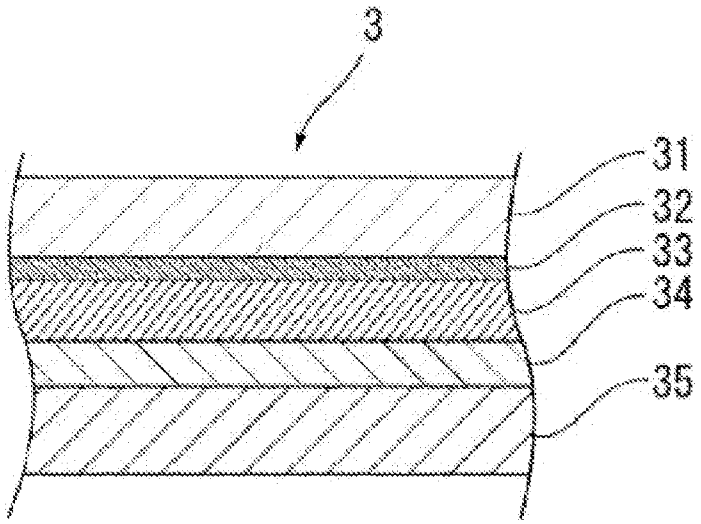
FIG. 6 is a schematic sectional view of an exterior material for electrical storage devices according to the present disclosure.
Figure 7:
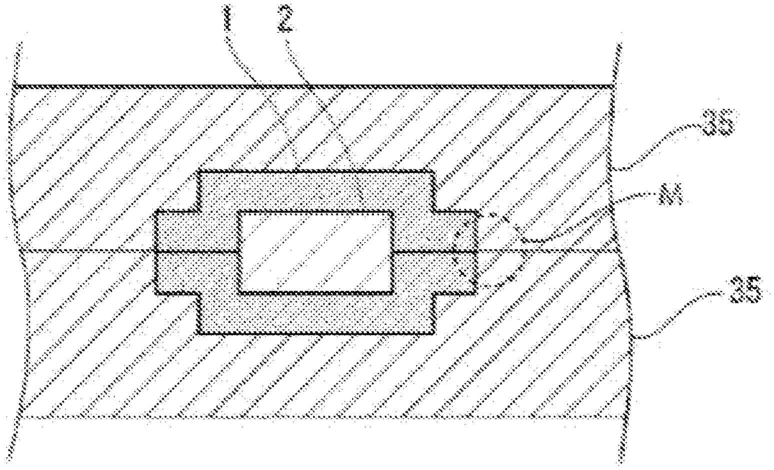
FIG. 7 is a schematic sectional view of a portion where heat-sealable resin layers are heat-sealed to each other with a metal terminal with an adhesive film interposed therebetween in an example.

Examples of the exterior material 3 for electrical storage devices include materials having a laminated structure including a laminate having at least a base material layer 31, a barrier layer 33, and a heat-sealable resin layer 35 in the stated order. FIG. 6 shows an aspect in which the base material layer 31, an adhesive agent layer 32 provided if necessary, the barrier layer 33, an adhesive layer 34 provided if necessary, and the heat-sealable resin layer 35 are laminated in the stated order as an example of a cross-sectional structure of the exterior material 3 for electrical storage devices. In the exterior material 3 for electrical storage devices, the base material layer 31 is on the outer layer side, and the heat-sealable resin layer 35 is an innermost layer. During construction of an electrical storage device, the heat-sealable resin layers 35 located on the peripheral edge of the electrical storage device element 4 is brought into contact with each other, and heat-welded to seal the electrical storage device element 4, so that the electrical storage device element 4 is sealed. FIGS. 1 to 3 show the electrical storage device 10 where the embossed-type exterior material 3 for electrical storage devices, which is molded by embossing molding, is used, but the exterior material 3 for electrical storage devices may be of non-molded pouch type. Examples of the pouch type include three-way seal, four-way seal and pillow type, and any of the types may be used.

The thickness of the laminate forming the exterior material 3 for electrical storage devices is not particularly limited, and is preferably about 190 μm, about 180 m or less, about 160 μm or less, about 155 μm or less, about 140 μm or less, about 130 m or less, or about 120 μm or less from the viewpoint of cost reduction, improvement of the energy density and the like, and preferably about 35 μm or more, about 45 μm or more, about 60 μm or more, or about 80 μm or more from the viewpoint of maintaining the function of the exterior material 3 for electrical storage devices, which is protection of the electrical storage device element 4. For example, the thickness is preferably in the range of about 35 to 190 μm, about 35 to 180 μm, about 35 to 160 μm, about 35 to 155 μm, about 35 to 140 μm, about 35 to 130 μm, about 35 to 120 μm, about 45 to 190 μm, about 45 to 180 μm, about 45 to 160 μm, about 45 to 155 μm, about 45 to 140 μm, about 45 to 130 μm or more, about 45 to 120 μm, about 60 to 190 μm, about 60 to 180 μm, about 60 to 160 μm, about 60 to 155 μm, about 60 to 140 μm, about 60 to 130 μm, about 60 to 120 μm, about 80 to 190 μm, about 80 to 180 μm, about 80 to 160 μm, about 80 to 155 μm, about 80 to 140 μm, about 80 to 130 μm or about 80 to 120 μm.

(Base Material Layer 31)

In the exterior material 3 for electrical storage devices, the base material layer 31 is a layer that functions as a base material of the exterior material for electrical storage devices, and forms the outermost layer side of the exterior material for electrical storage devices.

The material that forms the base material layer 31 is not particularly limited as long as it has an insulation quality. Examples of the material that forms the base material layer 31 include polyester, polyamide, epoxy, acrylic, fluororesins, polyurethane, silicone resins, phenol, polyetherimide, polyimide and mixtures and copolymers thereof. Polyester such as polyethylene terephthalate or polybutylene terephthalate has the advantage that it is excellent in electrolytic solution resistance, so that whitening etc. due to deposition of an electrolytic solution is hard to occur, and thus the polyester is suitably used as a material for formation of the base material layer 31. In addition, a polyamide film is excellent in stretchability, can prevent occurrence of whitening due to resin breakage in the base material layer 31 during molding, and is thus suitably used as a material for formation of the base material layer 31.

The base material layer 31 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 31.

Among them, nylons and polyesters are preferable and biaxially stretched nylons and biaxially stretched polyesters are more preferable as resin films for formation of the base material layer 31.

The base material layer 31 can also be laminated with a resin film which is made of a different material for improving pinhole resistance, and insulation quality as a packaging of an electrical storage device. Specific examples include a multilayer structure in which a polyester film and a nylon film are laminated, and a multilayer structure in which a biaxially stretched polyester and a biaxially stretched nylon are laminated. When the base material layer 31 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method.

In addition, the friction of the base material layer 31 may be reduced for improving moldability. When the friction of the base material layer 31 is reduced, the friction coefficient of the surface thereof is not particularly limited, and it is, for example, 1.0 or less. Examples of the method for reducing the friction of the base material layer 31 include matting treatment, formation of a thin film layer of a slipping agent, and a combination thereof.

The thickness of the base material layer 31 is, for example, about 10 to 50 μm, preferably about 15 to 30 μm.

(Adhesive Agent Layer 32)

In the exterior material 3 for electrical storage devices, the adhesive agent layer 32 is a layer disposed on the base material layer 31 if necessary for imparting adhesion to the base material layer 31. That is, the adhesive agent layer 32 is provided between the base material layer 31 and the barrier layer 33.

The adhesive agent layer 32 is formed from an adhesive capable of bonding the base material layer 31 and the barrier layer 33. The adhesive used for forming the adhesive agent layer 32 may be a two-liquid curable adhesive, or may be a one-liquid curable adhesive. In addition, the adhesion mechanism of the adhesive used for forming the adhesive agent layer 32 is not particularly limited, and may be any one of a chemical reaction type, a solvent volatilization type, a heat melting type, a heat pressing type and so on.

As resin components of adhesives that can be used for formation of the adhesive agent layer 32, polyurethane-based two-liquid curable adhesive agents; and polyamides, polyesters or blend resins of these resins and modified polyolefins are preferable because they are excellent in spreadability, durability and a yellowing inhibition action under high-humidity conditions, a thermal degradation inhibition action during heat-sealing, and so on, and effectively suppress occurrence of delamination by inhibiting a reduction in lamination strength between the base material layer 31 and the barrier layer 33.

The adhesive agent layer 32 may be made multilayered with different adhesive components. When the adhesive agent layer 32 is made multilayered with different components, it is preferable that a resin excellent in bondability to the base material layer 31 is selected as an adhesive component to be disposed on the base material layer 31 side, and an adhesive component excellent in bondability to the barrier layer 33 is selected as an adhesive component to be disposed on the barrier layer 33 side, from the viewpoint of improving lamination strength between the base material layer 31 and the barrier layer 33. When the adhesive agent layer 32 is made multilayered with different adhesive components, specific examples of the preferred adhesive component to be disposed on the barrier layer 33 side include acid-modified polyolefins, metal-modified polyolefins, mixed resins of polyesters and acid-modified polyolefins, and resins containing a copolymerization polyester.

The thickness of the adhesive agent layer 32 is, for example, about 2 to 50 μm, preferably about 3 to 25 μm.

(Barrier Layer 33)

In the exterior material for electrical storage devices, the barrier layer 33 is a layer which is intended to improve the strength of the exterior material for electrical storage devices and which has a function of preventing ingress of water vapor, oxygen, light and the like into the electrical storage device. The barrier layer 33 is preferably a metal layer, i.e. a layer formed of a metal. Specific examples of the metal forming the barrier layer 33 include aluminum, stainless and titanium, with aluminum being preferred. The barrier layer 33 can be formed from, for example, a metal foil, a metal vapor-deposited film, an inorganic oxide vapor-deposited film, a carbon-containing inorganic oxide vapor-deposited film, a film provided with any of these vapor-deposited films, or the like, and is formed preferably from a metal foil, more preferably from an aluminum foil. From the viewpoint of preventing generation of wrinkles and pinholes in the barrier layer 33 during manufacturing of the exterior material for electrical storage devices, it is more preferable to form the barrier layer from a soft aluminum foil such as annealed aluminum (JIS H4160: 1994 A8021H-O, JIS H4160: 1994 A8079H-O, JIS H4000:2014 A8021P-O, JIS H4000:2014 A8079P-O).

The thickness of the barrier layer 33 is preferably about 10 to 200 μm, more preferably about 20 to 100 μm, from the viewpoint of making pinholes less likely to be generated by molding while thinning the exterior material for electrical storage devices.

In addition, at least one surface, preferably both surfaces, of the barrier layer 33 are subjected to a chemical conversion treatment for stabilization of bonding, prevention of dissolution and corrosion, and so on. Here, the chemical conversion treatment is a treatment for forming a corrosion-resistant film on the surface of the barrier layer.

(Adhesive Layer 34)

In the exterior material 3 for electrical storage devices, the adhesive layer 34 is a layer provided between the barrier layer 33 and the heat-sealable resin layer 35 if necessary for firmly bonding the heat-sealable resin layer 35.

The adhesive layer 34 is formed from an adhesive capable of bonding the barrier layer 33 and the heat-sealable resin layer 35 to each other. The composition of the adhesive used for forming the adhesive layer is not particularly limited, and examples thereof include resin compositions containing an acid-modified polyolefin. Examples of the acid-modified polyolefin include those identical to the acid-modified polyolefins exemplified for the first polyolefin layer 12*a* and the second polyolefin layer 12*b*.

The thickness of the adhesive layer 34 is, for example, about 1 to 40 μm, preferably about 2 to 30 μm.

(Heat-Sealable Resin Layer 35)

In the exterior material 3 for electrical storage devices, the heat-sealable resin layer 35 is a layer which corresponds to an innermost layer and performs a function of hermetically sealing the electrical storage device element by heat-welding the heat-sealable resin layers to each other during construction of the electrical storage device.

As described above, the absolute value of a difference between the heat of fusion ΔH4 of the heat-sealable resin layer 35 of the exterior material 3 for electrical storage devices for which the adhesive film 1 for metal terminal according to the present disclosure is used and the heat of fusion ΔH2 of the second polyolefin layer 12*b* of the adhesive film 1 for metal terminal is preferably about 0.0 to 5.0 J/g, or about 0.0 to 3.0 J/g. It becomes easier to enhance adhesion between the second polyolefin layer 12*b* and the heat-sealable resin layer 35 as the absolute value of a difference between the heat of fusion ΔH4 and the heat of fusion ΔH2 decreases (i.e. as the absolute value of the difference becomes closer to 0.0 J/g).

The resin component to be used in the heat-sealable resin layer 35 is not particularly limited as long as it can be heat-welded, and examples thereof include polyolefins and cyclic polyolefins.

As described above, the absolute value of a difference between the melting peak temperature mp4 of the heat-sealable resin layer 35 of the exterior material for electrical storage devices for which the adhesive film 1 for metal terminal according to the present disclosure is used and the melting peak temperature mp2 of the second polyolefin layer 12*b* of the adhesive film 1 for metal terminal is preferably about 0 to 5 °C, or about 0 to 3 °C. It becomes easier to enhance adhesion between the second polyolefin layer 12*b* and the heat-sealable resin layer 35 as the absolute value of a difference between the melting peak temperature mp4 and the melting peak temperature mp2 decreases (i.e. as the absolute value of the difference becomes closer to 0 °C).

As described above, the absolute value of a difference between the melt mass flow rate (MFR) T4 of the heat-sealable resin layer 35 of the exterior material for electrical storage devices for which the adhesive film 1 for metal terminal according to the present disclosure is used and the melt mass flow rate (MFR) T2 of the second polyolefin layer 12*b* of the adhesive film 1 for metal terminal is preferably about 0 to 5 g/10 min, or about 0 to 3 g/10 min. It becomes easier to enhance adhesion between the second polyolefin layer 12*b* and the heat-sealable resin layer 35 as the absolute value of a difference between the melt mass flow rate (MFR) T4 and the melt mass flow rate (MFR) T2 decreases (i.e. as the absolute value of the difference becomes closer to 0 g/10 min).

Specific examples of the polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferable, and norbornene is further preferable. Examples of the constituent monomer include styrene.

Among these resin components, crystalline or noncrystalline polyolefins, cyclic polyolefins and blend polymers thereof are preferable, and polyethylene, polypropylene, copolymers of ethylene and norbornene, and blend polymers of two or more thereof are more preferable.

The heat-sealable resin layer 35 may be formed from one resin component alone, or may be formed from a blend polymer obtained by combining two or more resin components. Further, the heat-sealable resin layer 35 may be formed of only one layer, but may be formed of two or more layers with the same resin component or different resin components. It is particularly preferable that the second polyolefin layer 12*b* and the heat-sealable resin layer 35 have the same resin because adhesion between these layers is improved.

The thickness of the heat-sealable resin layer 35 is not particularly limited, and is, for example, about 2 to 2000 μm, preferably about 5 to 1000 μm, still more preferably about 10 to 500 μm.

2. Electrical Storage Device

The electrical storage device 10 of the present disclosure includes the electrical storage device element 4 including at least a positive electrode, a negative electrode and an electrolyte; the exterior material 3 for electrical storage devices that seals the electrical storage device element 4; and the metal terminal 2 electrically connected to each of the positive electrode and the negative electrode and protruding to the outside of the exterior material 3 for electrical storage devices. In the electrical storage device 10 of the present disclosure, the adhesive film 1 for metal terminal according to the present disclosure is interposed between the metal terminal 2 and the exterior material 3 for electrical storage devices. That is, the electrical storage device 10 of the present disclosure can be manufactured by a method including the step of interposing the adhesive film 1 for metal terminal according to the present disclosure between the metal terminal 2 and the exterior material 3 for electrical storage devices.

Specifically, the electrical storage device element 4 including at least a positive electrode, a negative electrode and an electrolyte is covered with the exterior material 3 for electrical storage devices such that a flange portion (a region where the heat-sealable resin layers 35 contact each other, the region being a peripheral edge portion 3*a* of the exterior material for electrical storage devices) of the exterior material for electrical storage devices can be formed on the peripheral edge of the electrical storage device element 4, where the adhesive film 1 for metal terminal according to the present disclosure is interposed between the metal terminal 2 and the heat-sealable resin layer 35 while the metal terminal 2 connected to each of the positive electrode and the negative electrode protrudes to the outside, and the heat-sealable resin layers 35 at the flange portion are heat-sealed to each other, thereby providing the electrical storage device 10 using the exterior material 3 for electrical storage devices. When the electrical storage device element 4 is stored using the exterior material 3 for electrical storage devices, the heat-sealable resin layer 35 of the exterior material 3 for electrical storage devices is on the inner side (a surface contacting the electrical storage device element 4).

The exterior material for electrical storage devices according to the present disclosure can be suitably used for electrical storage devices such as batteries (including condensers, capacitors and the like.). The exterior material for electrical storage devices according to the present disclosure may be used for either primary batteries or secondary batteries, and is preferably used for secondary batteries. The type of a secondary battery to which the exterior material for electrical storage devices according to the present disclosure is applied is not particularly limited, and examples thereof include lithium ion batteries, lithium ion polymer batteries, solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, preferred subjects to which the exterior material for electrical storage devices according to the present disclosure is applied include lithium ion batteries and lithium ion polymer batteries.

EXAMPLES

Hereinafter, the present disclosure will be described in detail by way of examples and comparative examples. However, the present disclosure is not limited to examples.

Manufacturing of Adhesive Film for Metal Terminal

Examples 1-8, 10, 11 and 13

Maleic anhydride-modified polypropylene (PPa) was provided as a polyolefin for forming a first polyolefin layer disposed on the metal terminal side, polypropylene (PP) was provided as a polyolefin for forming a second polyolefin layer disposed on the side of an exterior material for electrical storage devices, and an unstretched polypropylene film (CPP, homopolypropylene) was provided as a base material. Next, for Examples 1-8, 10, 11 and 13, maleic anhydride-modified polypropylene (PPa) was extruded onto one surface of the base material (CPP) by a T-die extruder to form a first polypropylene layer, and polypropylene (PP) was extruded onto the other surface of the base material (CPP) by a T-die extruder to form a second polypropylene layer, thereby obtaining an adhesive film for metal terminal in which a first polyolefin layer (PPa layer), a base material (CPP layer) and a second polyolefin layer (PP layer) were laminated in the stated order. The laminated configuration including the thickness of each layer is: first polyolefin layer (PPa having a thickness of 50 μm)/base material (CPP layer having a thickness of 50 μm)/second polyolefin layer (PP layer having a thickness of 50 μm) for Examples 1, 2 and 10; first polyolefin layer (PPa layer having a thickness of 50 μm)/base material (CPP layer having a thickness of 60

μm)/second polyolefin layer (PP layer having a thickness of 40 μm) for Examples 3-8 and 11; and first polyolefin layer (PPa layer having a thickness of 20 μm)/base material (CPP layer having a thickness of 40 μm)/second polyolefin layer (PP layer having a thickness of 20 m) for Example 13. The heat of fusion, the melting peak temperature and the melt mass flow rate (MFR) of the first polyolefin layer, the second polyolefin layer and the base material are as shown in Table 1-3. These physical property values are adjusted by the composition (blending ratio of a polyethylene component etc.), molecular weight and the like of each resin.

Example 9

Except that a film having a three-layered configuration with block polypropylene (thickness: 5 μm), homopolypropylene (thickness: 40 μm) and block polypropylene (thickness: 5 μm) laminated in the stated order was used instead of the unstretched polypropylene film (CPP, homopolypropylene), the same procedure as in Example 1 was carried out to obtain an adhesive film for metal terminal with a first polyolefin layer (PPa layer having a thickness of 50 μm), a base material (the above-mentioned film having a three-layered configuration and having a total thickness of 50 m) and a second polyolefin layer (PP layer having a thickness of 50 μm) laminated in the stated order. The heat of fusion, the melting peak temperature and the melt mass flow rate (MFR) of the first polyolefin layer, the second polyolefin layer and the base material are as shown in Table 1-3. These physical property values are adjusted by the composition (blending ratio of a polyethylene component etc.), molecular weight and the like of each resin.

Example 12

Except that maleic anhydride-modified polypropylene (PPa) was extruded onto one surface of a base material (thickness: 50 μm, CPP, homopolypropylene) by a T-die extruder to form a first polypropylene layer (thickness: 100 μm), polypropylene (PP) was extruded onto the other surface of the base material by a T-die extruder to form a second polypropylene layer (thickness: 50 μm), thereby obtaining an adhesive film for metal terminal with a first polyolefin layer (PPa layer), a base material (CPP layer) and a second polyolefin layer (PP layer) laminated in the stated order, the same procedure as in Example 1 was carried out to obtain an adhesive film for metal terminal with a first polyolefin layer (PPa layer having a thickness of 100 μm), a base material (CPP layer having a thickness of 50 μm) and a second polyolefin layer (PP layer having a thickness of 50 μm) laminated in the stated order. The heat of fusion, the melting peak temperature and the melt mass flow rate (MFR) of the first polyolefin layer, the second polyolefin layer and the base material are as shown in Table 1-3. These physical property values are adjusted by the composition (blending ratio of a polyethylene component etc.), molecular weight and the like of each resin.

Comparative Example 1

Maleic anhydride-modified polypropylene (PPa) as a polyolefin for forming a first polyolefin layer, polypropylene (PP) was provided as a polyolefin for forming a second polyolefin layer, and a polypropylene film (PP) colored black with carbon black was provided as a polyolefin layer forming a base material. Without using a base material, maleic anhydride-modified polypropylene (PPa) and polypropylene (PP) were co-extruded to obtain an adhesive film for metal terminal with a first polyolefin layer (PPa layer having a thickness of 70 μm), a base material (PP layer having a thickness of 50 μm) and a second polyolefin layer (PP layer having a thickness of 30 μm) laminated in the stated order. The heat of fusion, the melting peak temperature and the melt mass flow rate (MFR) of the first polyolefin layer, the second polyolefin layer and the base material are as shown in Table 1-3. These physical property values are adjusted by the composition (blending ratio of a polyethylene component etc.), molecular weight and the like of each resin.

Comparative Example 2

Maleic anhydride-modified polypropylene (PPa) was provided as a polyolefin for forming a first polyolefin layer, maleic anhydride-modified polypropylene (PPa) was provided as a polyolefin for forming a second polyolefin layer, and a polypropylene film (PP, homopolypropylene) was provided as a base material. Using the resins for the layers, multilayer air-cooling inflation molding was performed to obtain an adhesive film for metal terminal with a first polyolefin layer (PPa layer having a thickness of 35 m), a base material (PP layer having a thickness of 80 μm) and a second polyolefin layer (PPa layer having a thickness of 35 μm) were laminated in the stated order. The heat of fusion, the melting peak temperature and the melt mass flow rate (MFR) of the first polyolefin layer, the second polyolefin layer and the base material are as shown in Table 1-3. These physical property values are adjusted by the composition (blending ratio of a polyethylene component etc.), molecular weight and the like of each resin.

<Measurement of Heat of Fusion>

Figure 11:
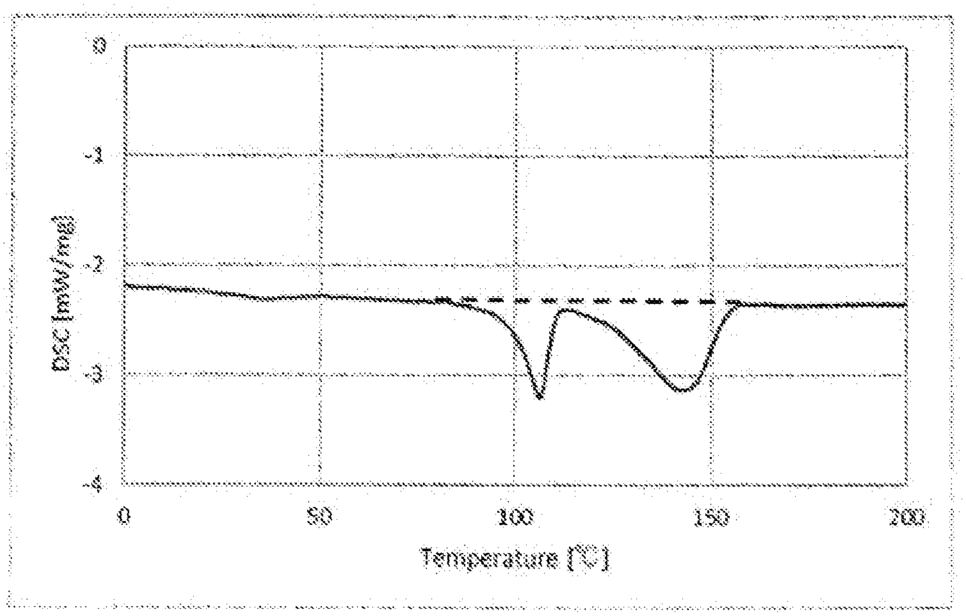
FIG. 11 is a DSC curve obtained in Example 1.

The first polyolefin layer, the second polyolefin layer and the heat-sealable resin layer of the exterior material were taken from the adhesive film for metal terminal, and used as measurement samples. The heat of fusion of the base material was determined by measuring the heat of fusion of the first polyolefin layer, the second polyolefin layer and the adhesive film for metal terminal, and subtracting the heat of fusion of the first polyolefin layer and the second polyolefin layer from the measured heat of fusion of the adhesive film for metal terminal. For each measurement sample, the heats of fusion ΔH1, ΔH2, ΔH3 and ΔH4 were measured in accordance with the provisions of JIS K 7122: 2012. The measurement is performed with a differential scanning calorimeter (DSC, for example, Differential Scanning Calorimeter Q 200 manufactured by TA Instruments). The measurement sample is held at −50 °C for 15 minutes, then heated from −50 °C to 210 °C at a temperature rise rate of 10 °C/min to measure the first heat of fusion ΔH (J/g), and then held at 210 °C for 10 minutes. Next, the measurement sample is cooled from 210 °C to −50 °C at a temperature lowering rate of 10 °C/min, and held for 15 minutes. Further, the second heat of fusion ΔH (J/g) is measured by heating the measurement sample from −50 °C to 210 °C at a temperature rise rate of 10 °C/min. The flow rate of the nitrogen gas is set to 50 ml/min. In accordance with the above procedure, the value of the first measured heat of fusion ΔH (J/g) is adopted. The heat of fusion is an area of a region surrounded by a base line (a line formed by connecting a start point and an end point of a base-to-base ridge line) and a peak in the DSC curve. For reference, the DSC curve obtained in Example 1 is shown in FIG. 11. In FIG. 11, the baseline is indicated by a broken line.

<Measurement of Melting Peak Temperature>

The first polyolefin layer, the second polyolefin layer and the base material were taken from the adhesive film for metal terminal, and used as measurement samples. For each measurement sample, the melting peak temperatures mp1, mp2 and mp3 were measured in accordance with the provisions of JIS K 7121: 2012 (Testing Methods for Transition Temperatures of Plastics (Amendment 1 of JIS K 7121: 1987)). The measurement is performed with a differential scanning calorimeter (DSC, for example, Differential Scanning Calorimeter Q 200 manufactured by TA Instruments). The measurement sample is held at −50 °C for 15 minutes, then heated from −50 °C to 210 °C at a temperature rise rate of 10 °C/min to measure the first melting peak temperature P (°C), and then held at 210 °C for 10 minutes. Next, the measurement sample is cooled from 210 °C to −50 °C at a temperature lowering rate of 10 °C/min, and held for 15 minutes. Further, the second melting peak temperature Q (°C) is measured by heating the measurement sample from −50 °C to 210 °C at a temperature rise rate of 10 °C/min. The flow rate of the nitrogen gas is set to 50 ml/min. In accordance with the above procedure, the first measured melting peak temperature P (°C) and the second measured melting peak temperature Q (°C) were determined, and the first measured melting peak temperature P was adopted as a melting peak temperature.

<Measurement of Melt Mass Flow Rate (MFR)>

The resins forming the first polyolefin layer, the second polyolefin layer and the base material and used for manufacturing the adhesive film for metal terminal were each used as a measurement sample. For each measurement sample, the melt flow rate (g/10 min) was measured with a melt indexer at a measurement temperature of 230 °C under a load of 2.16 kg by a method conforming to Method A specified in JIS K 7210: 2014.

<Measurement of Adhesion Strength Between Adhesive Film for Metal Terminal and Heat-Sealable Resin Layer>

(Production of Exterior Material)

First, an exterior material for electrical storage devices (hereinafter, sometimes referred to simply as an "exterior material") was produced in accordance with the following procedure. A base material layer (thickness: 30 μm) including a polyethylene terephthalate film (thickness: 12 μm), an adhesive agent layer (thickness: 3 μm) and a nylon film (thickness: 15 km) was laminated onto an aluminum alloy foil (thickness: 40 km) by a dry lamination method, and a heat-sealable resin layer was laminated on the other surface by co-extrusion. Specifically, a two-liquid urethane adhesive (polyol compound and aromatic isocyanate-based compound) was applied to the nylon film, so that an adhesive agent layer (thickness: 3 km) was formed on the nylon film. Next, an adhesive agent layer and a polyethylene terephthalate film were laminated onto the nylon film to produce a base material layer. A two-liquid urethane adhesive (polyol compound and aromatic isocyanate-based compound) was then applied to one surface of a barrier layer including an aluminum alloy foil, so that an adhesive agent layer (thickness: 3 km) was formed on the aluminum alloy foil. The adhesive agent layer and the base material layer having a bonding surface on the nylon film side were then laminated onto the aluminum alloy foil, and aging treatment was then performed to produce a laminate of base material layer/adhesive agent layer/barrier layer. Next, an adhesive layer (thickness: 40 μm, disposed on the metal layer side) including a maleic anhydride-modified polypropylene resin and a heat-sealable resin layer (thickness: 40 m, innermost layer) including a random polypropylene resin were co-extruded onto the barrier layer of the laminate to laminate an adhesive layer and a heat-sealable resin layer on the barrier layer. Next, the obtained laminate was heated at 190 °C for 2 minutes to obtain an exterior material for electrical storage devices with a base material layer, an adhesive agent layer, a barrier layer, an adhesive layer and a heat-sealable resin layer laminated in the stated order. The heat of fusion ΔH4, the melting beak temperature mp4 and the melt mass flow rate (MFR) T4 of the heat-sealable resin layer are as shown in Table 1-3. The methods for measurement thereof are the same as those for the adhesive film for metal terminal except that the heat-sealable resin layer is used as a measurement sample.

(Evaluation of Adhesion when Heat-Sealing is Performed for 3 Seconds)

Figure 8:
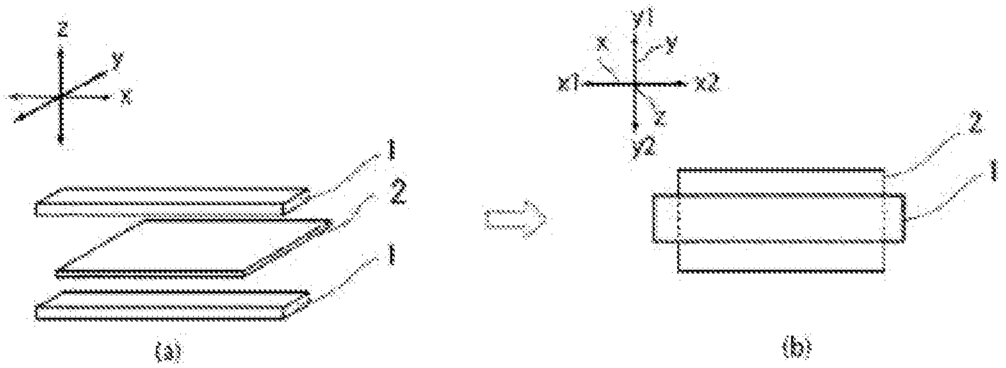
FIG. 8 is a schematic diagram for illustrating a method for preparing a sample for use in evaluation of adhesion, evaluation of followability and evaluation on collapse in an example.

As a metal terminal, aluminum foil (JIS H 4160: 1994 A 8079 H-O) having a size of 40 mm in MD and 22.5 mm in TD and a thickness of 400 μm was provided. Each of the adhesive films which had been obtained in examples and comparative examples, was cut to a length (MD) of 45 mm and a width (TD) of 20 mm. Next, as shown in the schematic diagram of FIG. 8, the metal terminal was sandwiched between the two adhesive films to obtain a laminate of an adhesive film, a metal terminal and an adhesive film. Here, the lamination was performed in such a manner that MD and TD of the metal terminal coincided with the length direction (MD) and the width direction (TD) of the adhesive film, respectively, and the centers of the metal terminal and the adhesive film coincided with each other. Next, with the laminate sandwiched between two tetrafluoroethylene-ethylene copolymer films (ETFE film, thickness 100 μm), the laminate was put on a hot plate heated to 190 °C, a 500 g weight with sponge was put thereon, and the laminate was left standing for 12 seconds to heat-weld the adhesive film to the metal terminal, thereby producing a metal terminal with an adhesive film. Here, as shown in the schematic view of FIG. 8, the metal terminal was sandwiched between the adhesive films to form a portion in which the periphery of the metal terminal was covered with the adhesive film and the two adhesive films were heat-welded to each other. Next, the exterior material was cut to a size of 60 mm in TD and 200 mm in MD, and as shown in the schematic diagram of FIG. 9, the exterior materials were opposed to each other with the heat-sealable resin layer on the inner side in such a manner that the length in MD was halved to 100 mm, and the obtained laminate was sandwiched between the heat-sealable resin layers opposed to each other. Here, the lamination was performed in such a manner that MD and TD of the exterior material coincided with the width direction (TD) and the length direction (MD) of the laminate, respectively. In this state, heat-sealing was performed under the conditions of a width of 7 mm (7 mm in the y-axis direction in FIG. 9(*b*)), 190 °C, a surface pressure of 1.0 MPa, and 3 seconds (see shaded region S in FIG. 9) using a heat-seal tester, and the heat-sealed product was naturally cooled to 25 °C to obtain a laminate in which the exterior material and the adhesive film were heat-welded to each other (see the schematic diagram of FIG. 9(*b*)).

Figure 9:
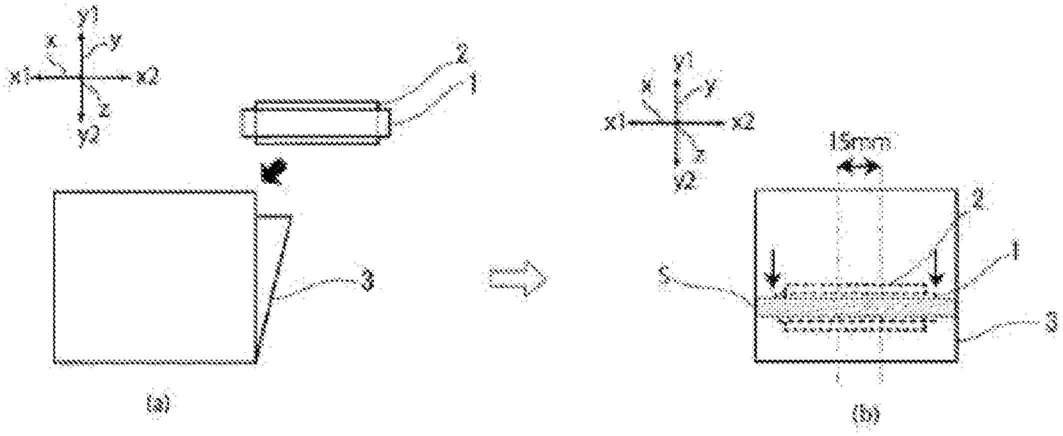
FIG. 9 is a schematic diagram for illustrating a method for preparing a sample for use in evaluation of adhesion, evaluation of followability and evaluation on collapse in an example.

Next, the central portion of the exterior material of the obtained laminate in TD was cut to a width of 15 mm (see two-dot broken line in FIG. 9(*b*) for the cutting position). Next, in an environment at 25 °C, the exterior material and the metal terminal were chucked and the adhesive film and the heat-sealable resin layer of the exterior material were peeled from each other along the y direction in FIG. 9(*b*) in Tensilon Versatile Material Tester (RTG-1210 manufactured by A&D Company, Limited). The maximum strength during the peeling was defined as peeling strength (N/15 mm) with respect to the exterior material. The peeling speed was 300 mm/min, the peeling angle was 180°, and the distance between chucks was 30 mm. An average of the values of three measurements was adopted.

A: Peeling strength is 120 N/15 mm or more

B: Peeling strength is 100 N/15 mm or more and less than 120 N/15 mm

C: The ratio of the peeling strength to the reference peeling strength is less than 100 N/15 mm (Evaluation of Adhesion when Heat-Sealing is Performed in Short Time (for 1 Second))

The adhesive film and the heat-sealable resin layer of the exterior material were peeled from each other to measure the peeling strength in the same manner as described above except that in the (adhesion when heat-sealing is performed for 3 seconds), the conditions for heat-sealing using a heat-seal tester were changed to conditions of 190 °C, a surface pressure of 1.0 MPa, and a short time of 1 second.

A: Peeling strength is 100 N/15 mm or more

B: Peeling strength is 80 N/15 mm or more and 100 N/15 mm

C: The ratio of the peeling strength to the reference peeling strength is less than 80 N/15 mm <Evaluation of Followability>

Figure 10:
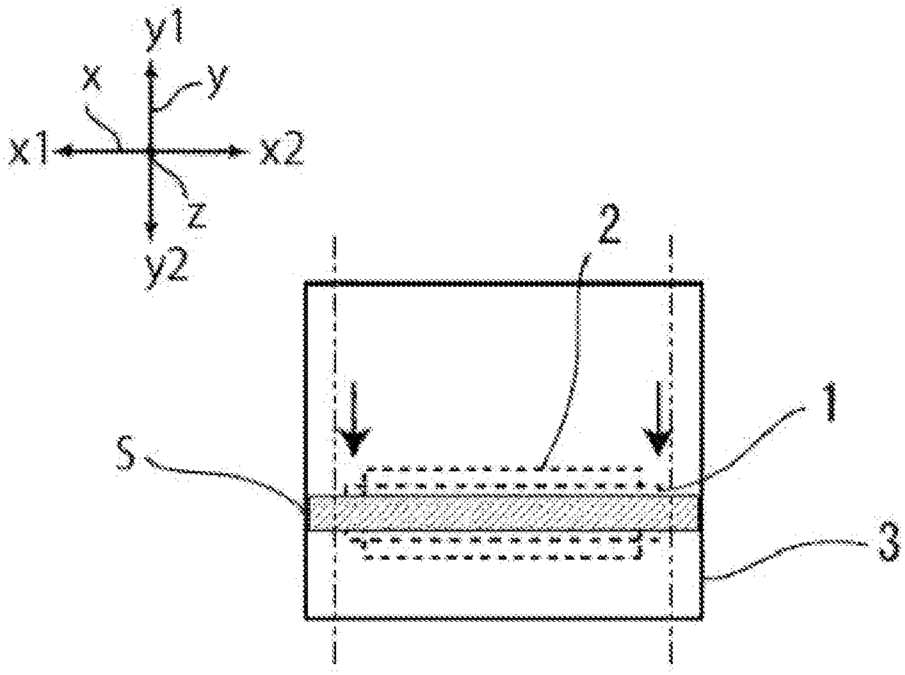
FIG. 10 is a schematic diagram for illustrating a method for preparing a sample for use in evaluation of followability in an example.

Ten laminates of the exterior material and the adhesive film, which had been obtained as described above (in adhesion when heat-sealing is performed in short time (for 1 second)) were prepared (see FIG. 10), and used as samples. For each sample, the heat-sealable resin layers opposed to each other were opened with the y1 side being the upper side and the y2 side being the lower side in the schematic diagram of FIG. 10, a high-penetrating dyeing solution (Micro Check manufactured by TAIHOKOHZAI CO., LTD.) was sprayed from the upper side (y1 side) to positions of both ends where the adhesive film was heat-sealed and the metal terminal was exposed (positions indicated by arrows at both ends in the x-axis direction in FIG. 10), and penetration of the dyeing solution into a gap between the adhesive film and the exterior material was examined to evaluate the followability of the adhesive film to the exterior material under heat-sealing. The evaluation was performed on the number of samples in which the dyeing solution penetrated into the gap between the adhesive film and the exterior material. When the dyeing solution penetrated from the upper side (y1 side) toward the lower side (y2 side) in FIG. 10, and the penetrant passed over the heat-sealed portion S and reached the lower side (y2 side), it was evaluated that the dyeing solution penetrated into the gap. The penetration of the dyeing solution was examined by cutting each sample at a position of 1 mm from the outside of the adhesive film of the sample (see the position of the two-dot chain line in FIG. 10) and observing the cross-section. The evaluation criteria are as follows. Table 4 shows the results.

A: The dyeing solution penetrated into the gap in none of the ten samples

B: The dyeing solution penetrated into the gap in one or more and two or less of the ten samples C: The dyeing solution penetrated into the gap in three or more of the ten samples <Evaluation on Collapse>

The laminate of the exterior material and the adhesive film, which had been obtained in (Evaluation of adhesion when heat-sealing is performed in a short time (for 1 second)) above, was used as a sample, the sample was cut along the thickness direction at the central position of a portion where the adhesive film was heat-sealed (cut in the y-axis direction and the thickness direction at the central portion of the laminate in the x-axis direction as shown in FIG. 9(*b*)), and the thickness of the adhesive film was measured. The thickness of the adhesive film before heat-sealing was defined as 100%, and from the ratio of the thickness after heat-sealing, evaluation on collapse was performed on the basis of the following criteria. The thickness is an average of the thicknesses of two adhesive films positioned above and below the metal terminal. Table 4 shows the results.

A: The thickness of the adhesive film after heat-sealing is 95% or more of the thickness before heat-sealing B: The thickness of the adhesive film after heat-sealing is 80% or more and less than 95% of the thickness before heat-sealing C: The thickness of the adhesive film after heat-sealing is less than 80% of the thickness before heat-sealing <Evaluation of Film Formability>

The film-formability of the first polyolefin layer in <Production of adhesive film for metal terminal> above was evaluated. Specifically, evaluation was performed on unevenness of the first polyolefin layer in the width direction (TD) during film formation. The thickness of the first polyolefin layer was measured at intervals of 5 mm in the width direction, and the unevenness in the width direction was evaluated on the basis of the following criteria based on 2a. Table 4 shows the results.

A: The unevenness in the width direction is less than 2.5 in terms of 2a

B: The unevenness in the width direction is 2.5 to 3.0 in terms of 2a

C: The unevenness in the width direction is more than 3.0 in terms of 2a

TABLE 1

| | Heat of fusion (J/g) | | | | | | |
|---|---|---|---|---|---|---|---|
| | First polyolefin layer on metal terminal side ΔH1 | Second polyolefin layer on exterior material side ΔH2 | Base material ΔH3 | Heat-sealable resin layer of exterior material ΔH4 | ΔH1-ΔH2 | ΔH3-ΔH1 | ΔH2-ΔH4 |
| Example 1 | 65.8 | 51.4 | 84.0 | 51.0 | 14.4 | 18.2 | 0.4 |
| Example 2 | 62.3 | 52.0 | 84.0 | 51.0 | 10.3 | 21.7 | 1.0 |
| Example 3 | 55.0 | 51.2 | 84.0 | 51.0 | 3.8 | 29.0 | 0.2 |
| Example 4 | 56.0 | 50.8 | 84.0 | 51.0 | 5.2 | 28.0 | −0.2 |
| Example 5 | 57.0 | 52.4 | 84.0 | 51.0 | 4.6 | 27.0 | 1.4 |
| Example 6 | 59.3 | 49.8 | 84.0 | 51.0 | 9.5 | 24.7 | −1.2 |

TABLE 1-continued

| | Heat of fusion (J/g) | | | | | | |
|---|---|---|---|---|---|---|---|
| | First polyolefin layer on metal terminal side ΔH1 | Second polyolefin layer on exterior material side ΔH2 | Base material ΔH3 | Heat-sealable resin layer of exterior material ΔH4 | ΔH1-ΔH2 | ΔH3-ΔH1 | ΔH2-ΔH4 |
| Example 7 | 61.4 | 51.3 | 84.0 | 51.0 | 10.1 | 22.6 | 0.3 |
| Example 8 | 63.6 | 51.2 | 84.0 | 51.0 | 12.4 | 20.4 | 0.2 |
| Example 9 | 61.2 | 51.0 | 82.0 | 51.0 | 10.2 | 20.8 | 0.0 |
| Example 10 | 58.1 | 51.2 | 84.0 | 51.0 | 6.9 | 25.9 | 0.2 |
| Example 11 | 58.2 | 51.4 | 84.0 | 51.0 | 6.8 | 25.8 | 0.4 |
| Example 12 | 58.3 | 51.2 | 84.0 | 51.0 | 7.1 | 25.7 | 0.2 |
| Example 13 | 57.2 | 51.2 | 84.0 | 51.0 | 6.0 | 26.8 | 0.2 |
| Comparative Example 1 | 47.6 | 40.0 | 65.0 | 51.0 | 7.6 | 17.4 | −11.0 |
| Comparative Example 2 | 46.1 | 46.1 | 80.0 | 51.0 | 0.0 | 33.9 | −4.9 |

TABLE 2

| | Melting peak temperature (°C) | | | | | | |
|---|---|---|---|---|---|---|---|
| | First polyolefin layer on metal terminal side mp1 | Second polyolefin layer on exterior material side mp2 | Base material mp3 | Heat-sealable resin layer of exterior material mp4 | mp1-mp2 | mp3-mp1 | mp2-mp4 |
| Example 1 | 141 | 138 | 162 | 138 | 3 | 21 | 0 |
| Example 2 | 141 | 138 | 162 | 138 | 3 | 21 | 0 |
| Example 3 | 141 | 138 | 162 | 138 | 3 | 21 | 0 |
| Example 4 | 141 | 138 | 162 | 138 | 3 | 21 | 0 |
| Example 5 | 141 | 138 | 162 | 138 | 3 | 21 | 0 |
| Example 6 | 141 | 138 | 162 | 138 | 3 | 21 | 0 |
| Example 7 | 141 | 138 | 162 | 138 | 3 | 21 | 0 |
| Example 8 | 141 | 138 | 162 | 138 | 3 | 21 | 0 |
| Example 9 | 141 | 138 | 161 | 138 | 3 | 20 | 0 |
| Example 10 | 141 | 138 | 162 | 138 | 3 | 21 | 0 |
| Example 11 | 141 | 138 | 162 | 138 | 3 | 21 | 0 |
| Example 12 | 141 | 138 | 162 | 138 | 3 | 21 | 0 |
| Example 13 | 141 | 138 | 162 | 138 | 3 | 21 | 0 |
| Comparative Example 1 | 141 | 140 | 162 | 138 | 1 | 21 | 2 |
| Comparative Example 2 | 143 | 143 | 163 | 138 | 0 | 20 | 5 |

TABLE 3

| | MFR (g/10 min) | | | | | | |
|---|---|---|---|---|---|---|---|
| | First polyolefin layer on metal terminal side T1 | Second polyolefin layer on exterior material side T2 | Base material T3 | Heat-sealable resin layer of exterior material T4 | T2-T1 | T1-T3 | T2-T4 |
| Example 1 | 7 | 11 | 3 | 11 | 4 | 4 | 0 |
| Example 2 | 7 | 11 | 3 | 11 | 4 | 4 | 0 |
| Example 3 | 7 | 11 | 3 | 11 | 4 | 4 | 0 |
| Example 4 | 7 | 11 | 3 | 11 | 4 | 4 | 0 |
| Example 5 | 7 | 11 | 3 | 11 | 4 | 4 | 0 |
| Example 6 | 7 | 11 | 3 | 11 | 4 | 4 | 0 |
| Example 7 | 7 | 11 | 3 | 11 | 4 | 4 | 0 |
| Example 8 | 7 | 11 | 3 | 11 | 4 | 4 | 0 |
| Example 9 | 7 | 11 | 4 | 11 | 4 | 3 | 0 |
| Example 10 | 7 | 11 | 3 | 11 | 4 | 4 | 0 |
| Example 11 | 7 | 11 | 3 | 11 | 4 | 4 | 0 |

TABLE 3-continued

| | MFR (g/10 min) | | | | | | |
|---|---|---|---|---|---|---|---|
| | First polyolefin layer on metal terminal side T1 | Second polyolefin layer on exterior material side T2 | Base material T3 | Heat-sealable resin layer of exterior material T4 | T2-T1 | T1-T3 | T2-T4 |
| Example 12 | 7 | 11 | 3 | 11 | 4 | 4 | 0 |
| Example 13 | 7 | 11 | 3 | 11 | 4 | 4 | 0 |
| Comparative Example 1 | 8 | 10 | 3 | 11 | 2 | 5 | −1 |
| Comparative Example 2 | 8 | 8 | 2 | 11 | 0 | 6 | −3 |

TABLE 4

| | Evaluation of adhesion | | | | | | |
|---|---|---|---|---|---|---|---|
| | Heat-sealing for 3 seconds | | Heat-sealing for 1 second | | Evaluation of followability | Evaluation on collapse | Film formability |
| Example 1 | 125N/15 mm | A | 108N/15 mm | A | A | A | C |
| Example 2 | 124N/15 mm | A | 109N/15 mm | A | A | A | C |
| Example 3 | 125N/15 mm | A | 108N/15 mm | A | A | A | A |
| Example 4 | 125N/15 mm | A | 111N/15 mm | A | A | A | A |
| Example 5 | 124N/15 mm | A | 107N/15 mm | A | A | A | A |
| Example 6 | 126N/15 mm | A | 110N/15 mm | A | A | A | B |
| Example 7 | 125N/15 mm | A | 109N/15 mm | A | A | A | C |
| Example 8 | 124N/15 mm | A | 108N/15 mm | A | A | A | C |
| Example 9 | 124N/15 mm | A | 110N/15 mm | A | A | A | C |
| Example 10 | 125N/15 mm | A | 111N/15 mm | A | A | A | A |
| Example 11 | 124N/15 mm | A | 110N/15 mm | A | A | A | A |
| Example 12 | 124N/15 mm | A | 111N/15 mm | A | A | A | A |
| Example 13 | 120N/15 mm | A | 107N/15 mm | A | A | A | A |
| Comparative Example 1 | 114N/15 mm | B | 87N/15 mm | B | A | B | A |
| Comparative Example 2 | 112N/15 mm | B | 15N/15 mm | C | C | A | A |

As described above, the present disclosure provides inventions of aspects as described below.

Item 1. An adhesive film for metal terminal which is interposed between a metal terminal electrically connected to an electrode of an electrical storage device element and an exterior material for electrical storage devices that seals the electrical storage device element, in which

- the adhesive film for metal terminal includes a laminate including, in a stated order, a first polyolefin layer disposed on the metal terminal side, a base material, and a second polyolefin layer disposed on the exterior material for electrical storage devices side;
- a heat of fusion $\Delta H1$ of the first polyolefin layer and a heat of fusion $\Delta H2$ of the second polyolefin layer which are measured in accordance with provisions of JIS K 7122: 2012 satisfy a relationship of $\Delta H1 > \Delta H2$; and
- a heat of fusion $\Delta H3$ of the base material which is measured in accordance with the provisions of JIS K 7122: 2012 is 70 J/g or more.

Item 2. The adhesive film for metal terminal according to item 1, in which the heat of fusion $\Delta H1$ of the first polyolefin layer, the heat of fusion $\Delta H2$ of the second polyolefin layer and the heat of fusion $\Delta H3$ of the base material satisfy a relationship of $\Delta H3 \geq \Delta H1 > \Delta H2$.

Item 3. The adhesive film for metal terminal according to item 1 or 2, in which the second polyolefin layer has a heat of fusion $\Delta H2$ of 20 J/g or more and 70 J/g or less.

Item 4. The adhesive film for metal terminal according to any one of items 1 to 3, in which the first polyolefin layer has a heat of fusion $\Delta H1$ of 30 J/g or more and 80 J/g or less.

Item 5. The adhesive film for metal terminal according to any one of items 1 to 4, in which a melting peak temperature mp1 of the first polyolefin layer, a melting peak temperature mp2 of the second polyolefin layer and a melting peak temperature mp3 of the base material measured in accordance with provisions of JIS K 7121: 2012 satisfy a relationship of $mp3 \geq mp1 > mp2$.

Item 6. The adhesive film for metal terminal according to any one of items 1 to 5, in which a melt mass flow rate T1 of the first polyolefin layer, a melt mass flow rate T2 of the second polyolefin layer and a melt mass flow rate T3 of the base material at 230 °C satisfy a relationship of $T2 > T1 > T3$.

Item 7. The adhesive film for metal terminal according to any one of items 1 to 6, in which the base material contains a polyolefin backbone.

Item 8. The adhesive film for metal terminal according to any one of items 1 to 7, in which the first polyolefin layer and the second polyolefin layer each have a thickness of 60 μm or less.

Item 9. The adhesive film for metal terminal according to any one of items 1 to 8, in which a thickness of the base material is 120 μm or less.

Item 10. The adhesive film for metal terminal according to any one of items 1 to 9, in which a thickness of the adhesive film for metal terminal is 220 μm or less.

Item 11. A method for manufacturing an adhesive film for metal terminal which is interposed between a metal terminal electrically connected to an electrode of an electrical storage device element and an exterior material for electrical storage devices that seals the electrical storage device element, in which the adhesive film for metal terminal includes a laminate including, in a stated order, a first polyolefin layer disposed on the metal terminal side, a base material, and a second polyolefin layer disposed on the exterior material for electrical storage devices side;

the method includes a step of preparing the laminate including the first polyolefin layer, the base material and the second polyolefin layer in the stated order;

a heat of fusion ΔH1 of the first polyolefin layer and a heat of fusion ΔH2 of the second polyolefin layer which are measured in accordance with provisions of JIS K 7122: 2012 satisfy a relationship of ΔH1>ΔH2; and a heat of fusion ΔH3 of the base material which is measured in accordance with the provisions of JIS K 7122: 2012 is 70 J/g or more.

Item 12. A metal terminal with an adhesive film for metal terminal in which the adhesive film for metal terminal according to any one of items 1 to 10 is attached to a metal terminal.

Item 13. An electrical storage device including: the electrical storage device element including at least a positive electrode, a negative electrode and an electrolyte; the exterior material for electrical storage devices that seals the electrical storage device element; and the metal terminal electrically connected to each of the positive electrode and the negative electrode and protruding to outside of the exterior material for electrical storage devices, in which the adhesive film for metal terminal according to any one of items 1 to 10 is interposed between the metal terminal and the exterior material for electrical storage devices.

Item 14. A method for manufacturing an electrical storage device including: the electrical storage device element including at least a positive electrode, a negative electrode and an electrolyte; the exterior material for electrical storage devices that seals the electrical storage device element; and the metal terminal electrically connected to each of the positive electrode and the negative electrode and protruding to outside of the exterior material for electrical storage devices, the method including a step of interposing the adhesive film for metal terminal according to any one of items 1 to 10 between the metal terminal and the exterior material for electrical storage devices, and sealing the electrical storage device element with the exterior material for electrical storage devices.

DESCRIPTION OF REFERENCE SIGNS

1: Adhesive film for metal terminal
2: Metal terminal
3: Exterior material for electrical storage devices
3*a*: Peripheral edge portion of exterior material for electrical storage devices
4: Electrical storage device element
10: Electrical storage device
11: Base material
12*a*: First polyolefin layer
12*b*: Second polyolefin layer
13: Adhesion promotor layer
31: Base material layer
32: Adhesive agent layer
33: Barrier layer
34: Adhesive layer
35: Heat-sealable resin layer

The invention claimed is:

1. An adhesive film for metal terminal which is interposed between a metal terminal electrically connected to an electrode of an electrical storage device element and an exterior material for electrical storage devices that seals the electrical storage device element, in which the adhesive film for the metal terminal includes a laminate including, in a stated order, a first polyolefin layer disposed on the metal terminal side, a base material, and a second polyolefin layer disposed on the exterior material for electrical storage devices side;

a heat of fusion ΔH1 of an entirety of the first polyolefin layer and a heat of fusion ΔH2 of an entirety of the second polyolefin layer which are measured in accordance with provisions of JIS K 7122:2012 satisfy a relationship of ΔH1>ΔH2, wherein ΔH1−ΔH2 is 3.8 or more and 7.1 or less; and a heat of fusion ΔH3 of the base material which is measured in accordance with the provisions of JIS K 7122:2012 is 70 J/g or more.

2. The adhesive film for metal terminal according to claim 1, wherein the heat of fusion ΔH1 of the first polyolefin layer, the heat of fusion ΔH2 of the second polyolefin layer and the heat of fusion ΔH3 of the base material satisfy a relationship of ΔH3≥ΔH1>ΔH2.

3. The adhesive film for metal terminal according to claim 1, wherein the second polyolefin layer has a heat of fusion ΔH2 of 20 J/g or more and 70 J/g or less.

4. The adhesive film for metal terminal according to claim 1, wherein the first polyolefin layer has a heat of fusion ΔH1 of 30 J/g or more and 80 J/g or less.

5. The adhesive film for metal terminal according to claim 1, wherein a melting peak temperature mp1 of the first polyolefin layer, a melting peak temperature mp2 of the second polyolefin layer and a melting peak temperature mp3 of the base material measured in accordance with provisions of JIS K 7121:2012 satisfy a relationship of mp3≥mp1>mp2.

6. The adhesive film for metal terminal according to claim 1, wherein a melt mass flow rate T1 of the first polyolefin layer, a melt mass flow rate T2 of the second polyolefin layer and a melt mass flow rate T3 of the base material at 230 °C satisfy a relationship of T2>T1>T3.

7. The adhesive film for metal terminal according to claim 1, wherein the base material contains a polyolefin backbone.

8. The adhesive film for metal terminal according to claim 1, in which the first polyolefin layer and the second polyolefin layer each have a thickness of 60 μm or less.

9. The adhesive film for metal terminal according to claim 1, wherein a thickness of the base material is 120 μm or less.

10. The adhesive film for metal terminal according to claim 1, wherein a thickness of the adhesive film for metal terminal is 220 μm or less.

11. A method for manufacturing an adhesive film for metal terminal which is interposed between a metal terminal electrically connected to an electrode of an electrical storage device element and an exterior material for electrical storage devices that seals the electrical storage device element, in which the adhesive film for metal terminal includes a laminate including, in a stated order, a first polyolefin layer disposed on the metal terminal side, a base material, and a second polyolefin layer disposed on the exterior material for electrical storage devices side;

the method comprises a step of preparing the laminate including the first polyolefin layer, the base material and the second polyolefin layer in the stated order;

a heat of fusion $\Delta H1$ of an entirety of the first polyolefin layer and a heat of fusion $\Delta H2$ of an entirety of the second polyolefin layer which are measured in accordance with provisions of JIS K 7122:2012 satisfy a relationship of $\Delta H1 > \Delta H2$, wherein $\Delta H1 - \Delta H2$ is 3.8 or more and 7.1 or less; and a heat of fusion $\Delta H3$ of the base material which is measured in accordance with the provisions of JIS K 7122:2012 is 70 J/g or more.

12. A metal terminal with an adhesive film for metal terminal, wherein the adhesive film for metal terminal according to claim 1 is attached to a metal terminal.

13. An electrical storage device comprising: the electrical storage device element including at least a positive electrode, a negative electrode and an electrolyte; the exterior material for electrical storage devices that seals the electrical storage device element; and the metal terminal electrically connected to each of the positive electrode and the negative electrode and protruding to outside of the exterior material for electrical storage devices, wherein the adhesive film for metal terminal according to claim 1 is interposed between the metal terminal and the exterior material for electrical storage devices.

14. A method for manufacturing an electrical storage device comprising: the electrical storage device element including at least a positive electrode, a negative electrode and an electrolyte; the exterior material for electrical storage devices that seals the electrical storage device element; and the metal terminal electrically connected to each of the positive electrode and the negative electrode and protruding to outside of the exterior material for electrical storage devices, the method comprising a step of interposing the adhesive film for metal terminal according to claim 1 between the metal terminal and the exterior material for electrical storage devices, and sealing the electrical storage device element with the exterior material for electrical storage devices.

* * * * *